United States Patent
Hyde et al.

(10) Patent No.: US 8,970,110 B2
(45) Date of Patent: Mar. 3, 2015

(54) MANAGED MULTIPLE-FILAMENT INCANDESCENT LIGHTING SYSTEM

(71) Applicant: Elwha LLC, Bellevue, WA (US)

(72) Inventors: Roderick A. Hyde, Redmond, WA (US); Jordin T. Kare, Seattle, WA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 210 days.

(21) Appl. No.: 13/653,712

(22) Filed: Oct. 17, 2012

(65) Prior Publication Data

US 2014/0103800 A1    Apr. 17, 2014

(51) Int. Cl.
- H01J 7/44 (2006.01)
- F26B 3/28 (2006.01)
- H05B 39/04 (2006.01)

(52) U.S. Cl.
CPC H05B 39/04 (2013.01); *Y02B 20/14* (2013.01)
USPC ............. 315/64; 315/68; 313/115; 313/578; 313/272; 362/211

(58) Field of Classification Search
CPC ...................................... F26B 3/28; H01J 3/28
USPC .................... 392/441; 315/294, 291, 360, 64; 313/578, 115
See application file for complete search history.

(56) References Cited

U.S. PATENT DOCUMENTS

| | | | |
|---|---|---|---|
| 1,456,568 A | 5/1923 | Quandt | |
| 3,886,400 A | 5/1975 | Dill | |
| 4,005,324 A | 1/1977 | Dolenga et al. | |
| 4,278,916 A | 7/1981 | Regan et al. | |
| 4,297,611 A * | 10/1981 | Cortorillo | 313/579 |
| 4,447,760 A | 5/1984 | Koo | |
| 4,734,625 A * | 3/1988 | Geanous et al. | 315/313 |
| 4,742,273 A | 5/1988 | Goldberg | |
| 5,061,879 A | 10/1991 | Munoz et al. | |
| 5,216,328 A * | 6/1993 | Lu | 315/88 |
| 5,296,783 A | 3/1994 | Fischer | |

(Continued)

FOREIGN PATENT DOCUMENTS

WO    WO 2007/022785 A2    3/2007

OTHER PUBLICATIONS

"Halogen lamp", Wikipedia, Aug. 7, 2012, pp. 1-7, http://en.wikipedia.org/wiki/Halogen_lamp.

(Continued)

*Primary Examiner* — Douglas W Owens
*Assistant Examiner* — Wei Chan

(57) ABSTRACT

Described embodiments include an incandescent lighting system and a method. A described system includes a gas filled and sealed glass envelope. The system includes at least two filaments enclosed within the glass envelope. Each filament of the at least two filaments is configured to generate light in response to a flow of electric current. The system includes a controller circuit configured to manage the at least two filaments in response to a filament management schedule. The filament management schedule includes managing the respective flow of electric current through each filament of the at least two filaments. In an embodiment, the schedule includes managing the respective flow of electric current through each filament of the at least two filaments so that not all of the at least two filaments generate light at any one time.

57 Claims, 17 Drawing Sheets

(56) References Cited

U.S. PATENT DOCUMENTS

| | | | |
|---|---|---|---|
| 5,430,354 A * | 7/1995 | Garbowicz et al. | 315/88 |
| 5,821,700 A * | 10/1998 | Malvaso | 315/291 |
| 5,952,832 A | 9/1999 | Stevanovic et al. | |
| 6,583,450 B1 | 6/2003 | Miller | |
| 6,713,966 B2 * | 3/2004 | Shultz et al. | 315/77 |
| 7,107,676 B2 * | 9/2006 | Fridrich | 29/882 |
| 7,322,870 B2 * | 1/2008 | Fridrich | 445/26 |
| 7,443,101 B2 * | 10/2008 | Bruwer | 315/129 |
| 7,688,347 B2 * | 3/2010 | Dolgoff | 348/44 |
| 7,811,148 B2 * | 10/2010 | Fridrich | 445/26 |
| 7,994,726 B2 * | 8/2011 | Bruwer | 315/200 A |
| 8,288,952 B2 * | 10/2012 | Bruwer | 315/200 A |
| 8,476,848 B2 | 7/2013 | Taniguchi | |
| 8,531,120 B2 * | 9/2013 | Bruwer | 315/200 A |
| 8,723,421 B2 * | 5/2014 | Hyde et al. | 315/64 |
| 2003/0076423 A1 * | 4/2003 | Dolgoff | 348/222.1 |
| 2003/0218426 A1 * | 11/2003 | Shultz et al. | 315/86 |
| 2004/0021431 A1 * | 2/2004 | Bruwer et al. | 315/291 |
| 2005/0092613 A1 * | 5/2005 | Fridrich | 205/138 |
| 2006/0103305 A1 * | 5/2006 | Bunk et al. | 313/578 |
| 2006/0197454 A1 * | 9/2006 | Mizukawa et al. | 315/46 |
| 2009/0116824 A1 * | 5/2009 | Suzuki et al. | 392/411 |
| 2010/0110682 A1 * | 5/2010 | Jung et al. | 362/249.02 |

OTHER PUBLICATIONS

"Striving for a Brighter Future: Our Vision", Aug. 7, 2012, pp. 1-2, http://mapleleaf251.tripod.com/strivingforabrighterfuture/id7.html.

* cited by examiner

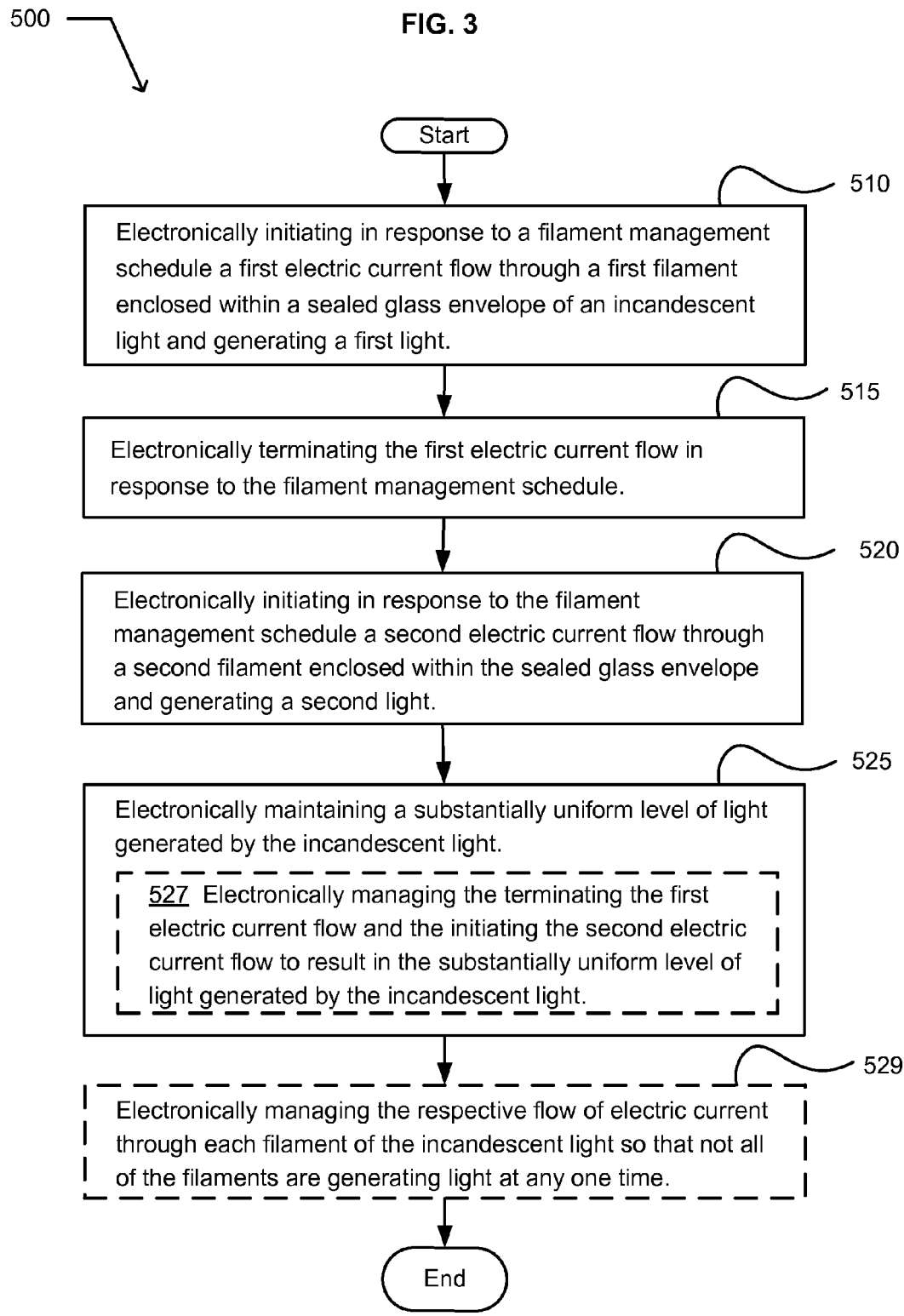

530
Electronically terminating the second electric current flow in response to the filament management schedule.

535
Electronically initiating the first electric current flow through the first filament in response to the filament management schedule and generating the first light.

540
Electronically managing the terminating the second electric current flow and the initiating the first electric current flow to result in the substantially uniform level of light generated by the incandescent light.

End

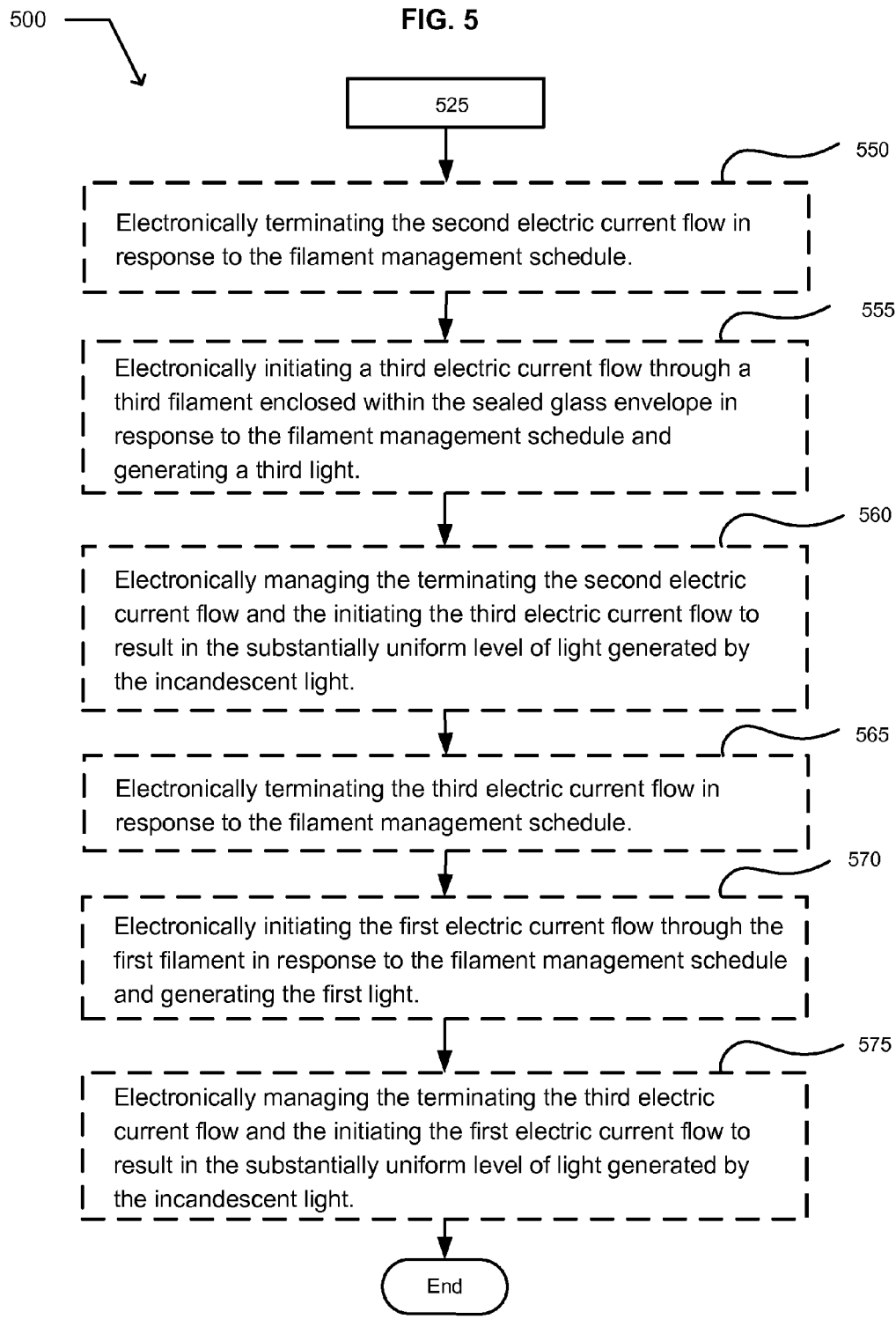

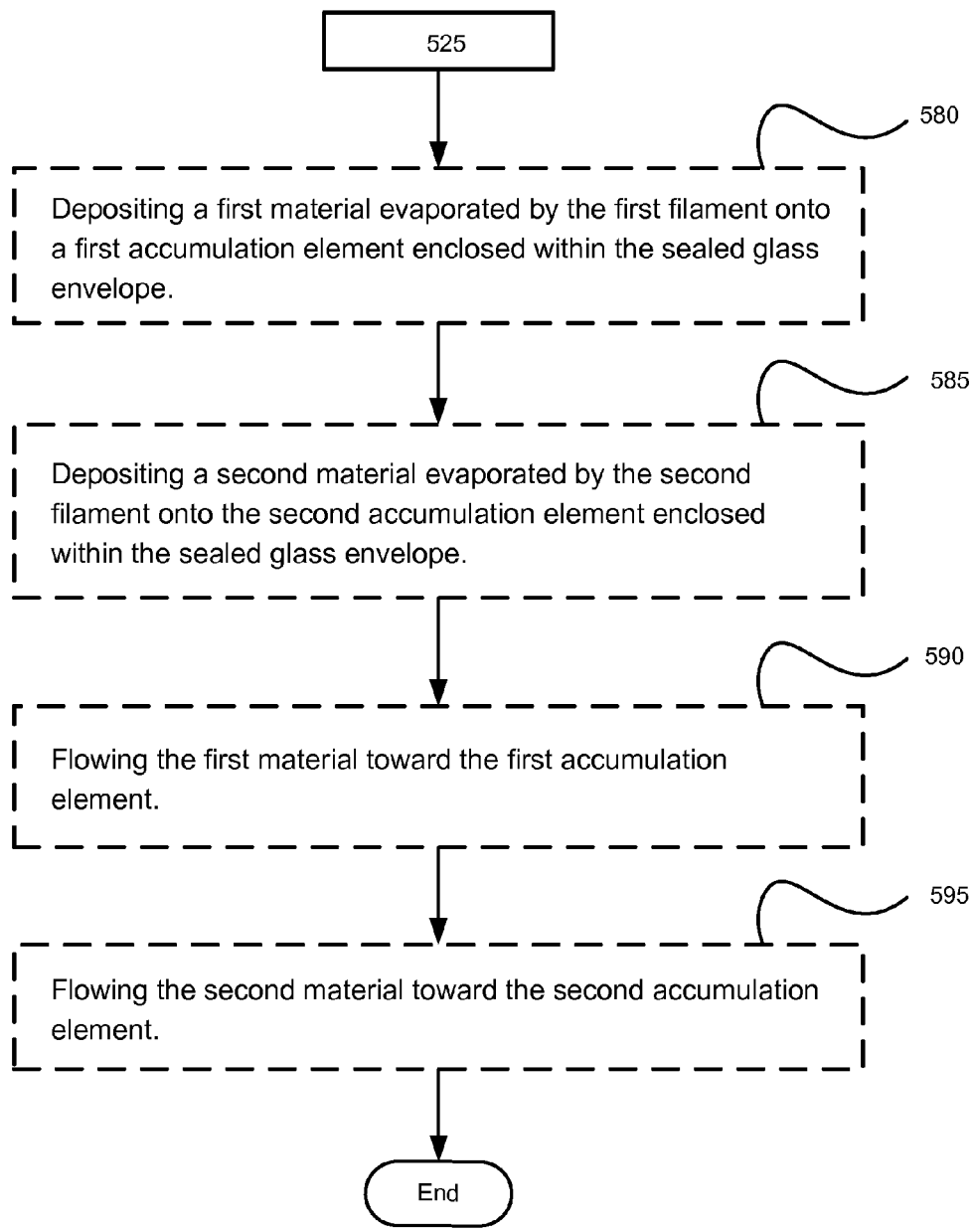

MANAGED MULTIPLE-FILAMENT INCANDESCENT LIGHTING SYSTEM

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 13/653,842, entitled MULTIPLE-FILAMENT INCANDESCENT LIGHTING SYSTEM MANAGED IN RESPONSE TO A SENSOR DETECTED ASPECT OF A FILAMENT, naming Roderick A. Hyde, Jordin T. Kare, Charles Whitmer, and Lowell L. Wood, Jr., as inventors, filed Oct. 17, 2012,is related to the present application.

U.S. patent application Ser. No. 13/653,882, entitled MULTIPLE-FILAMENT TUNGSTEN-HALOGEN LIGHTING SYSTEM HAVING MANAGED TUNGSTEN REDEPOSITION, naming Roderick A. Hyde, Jordin T. Kare, Charles Whitmer, and Lowell L. Wood, Jr., as inventors, filed Oct. 17, 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a system. In this embodiment, the system includes an incandescent lighting system. The system includes a gas filled and sealed glass envelope. The system includes at least two filaments enclosed within the glass envelope, each filament of the at least two filaments is configured to generate light in response to a flow of electric current. The system includes a controller circuit configured to manage the at least two filaments in response to a filament management schedule. The filament management schedule includes managing the respective flow of electric current through each filament of the at least two filaments. In an embodiment, the filament management system includes maintaining a substantially uniform level of light generation by the at least two filaments. In an embodiment, the filament management system includes managing the respective flow of electric current through each filament of the at least two filaments so that not all of the at least two filaments generate light at any one time.

In an embodiment, the system includes a power supply circuit configured to supply a voltage or waveform suitable for use by the controller circuit. In an embodiment, the controller circuit is further configured to test a filament of the at least two filaments in response to the filament management schedule.

For example, and without limitation, an embodiment of the subject matter described herein includes a system. In this embodiment, the system includes a system. The system includes a gas filled and sealed glass envelope. The system includes at least two filaments enclosed within the glass envelope, each filament of the at least two filaments is configured to generate light in response to a flow of electric current. The system includes a controller circuit configured to manage the at least two filaments in response to a filament management schedule. The filament management schedule includes managing a respective flow of electric current through each filament of the at least two filaments. The system includes an accumulation element enclosed within the glass envelope and structured to facilitate deposition thereon of material evaporated by at least one filament of the at least two filaments. In an embodiment, the system includes a heat sink. In an embodiment, the system includes a flow directing element enclosed within the glass envelope and structured to urge a flow of heated gas and material evaporated from a filament toward the accumulation element.

For example, and without limitation, an embodiment of the subject matter described herein includes a method. In this embodiment, the method includes electronically initiating in response to a filament management schedule a first electric current flow through a first filament enclosed within a sealed glass envelope of an incandescent light and generating a first light. The method includes electronically terminating the first electric current flow in response to the filament management schedule. The method includes electronically initiating in response to the filament management schedule a second electric current flow through a second filament enclosed within the sealed glass envelope and generating a second light. The method includes electronically maintaining a substantially uniform level of light generated by the incandescent light.

In an embodiment, the method includes electronically managing the respective flow of electric current through each filament of the incandescent light so that not all of the filaments are generating light at any one time. In an embodiment, the method further includes electronically terminating the second electric current flow in response to the filament management schedule. In this embodiment, the method further includes electronically initiating the first electric current flow through the first filament in response to the filament management schedule and generating the first light. In this embodiment, the method further includes electronically managing the terminating the second electric current flow and the initiating the first electric current flow to result in the substantially uniform level of light generated by the incandescent light.

In an embodiment, the method further includes electronically terminating the second electric current flow in response to the filament management schedule. In this embodiment, the method further includes electronically initiating a third electric current flow through a third filament enclosed within the sealed glass envelope in response to the filament management schedule and generating a third light. In this embodiment, the method further includes electronically managing the terminating the second electric current flow and the initiating the third electric current flow to result in the substantially uniform level of light generated by the incandescent light. In this embodiment, the method may further include electronically terminating the third electric current flow in response to the filament management schedule. In this embodiment, the method may further include electronically initiating the first electric current flow through the first filament in response to the filament management schedule and generating the first light. In this embodiment, the method may further include electronically managing the terminating the third electric current flow and the initiating the first electric current flow to result in the substantially uniform level of light generated by the incandescent light.

In an embodiment, the method further includes depositing a first material evaporated by the first filament onto a first accumulation element enclosed within the sealed glass envelope. In this embodiment, the method further includes depositing a second material evaporated by the second filament onto the second accumulation element enclosed within the sealed glass envelope. In this embodiment, the method may further include flowing the first material toward the first accumulation element. In this embodiment, the method may further include flowing the second material toward the second accumulation element.

For example, and without limitation, an embodiment of the subject matter described herein includes a system. In this embodiment, the system includes means for electronically initiating in response to a filament management schedule a first electric current flow through a first filament of an incandescent light and generating a first light. The system includes means for electronically terminating the first electric current flow in response to the filament management schedule. The system includes means for electronically initiating in response to the filament management schedule a second electric current flow through a second filament of the incandescent light and generating a second light. The system includes means for electronically managing the terminating the first electric current flow and the initiating the second electric current flow to generate a substantially uniform level of light generation by the incandescent light.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 illustrates an example operational flow 500;

FIG. 4 illustrates an alternative embodiment of the operational flow 500 described in conjunction with FIG. 3;

FIG. 5 illustrates an alternative embodiment of the operational flow 500 described in conjunction with FIG. 3;

FIG. 6 illustrates an alternative embodiment of the operational flow 500 described in conjunction with FIG. 3;

DETAILED DESCRIPTION

Figure 1:
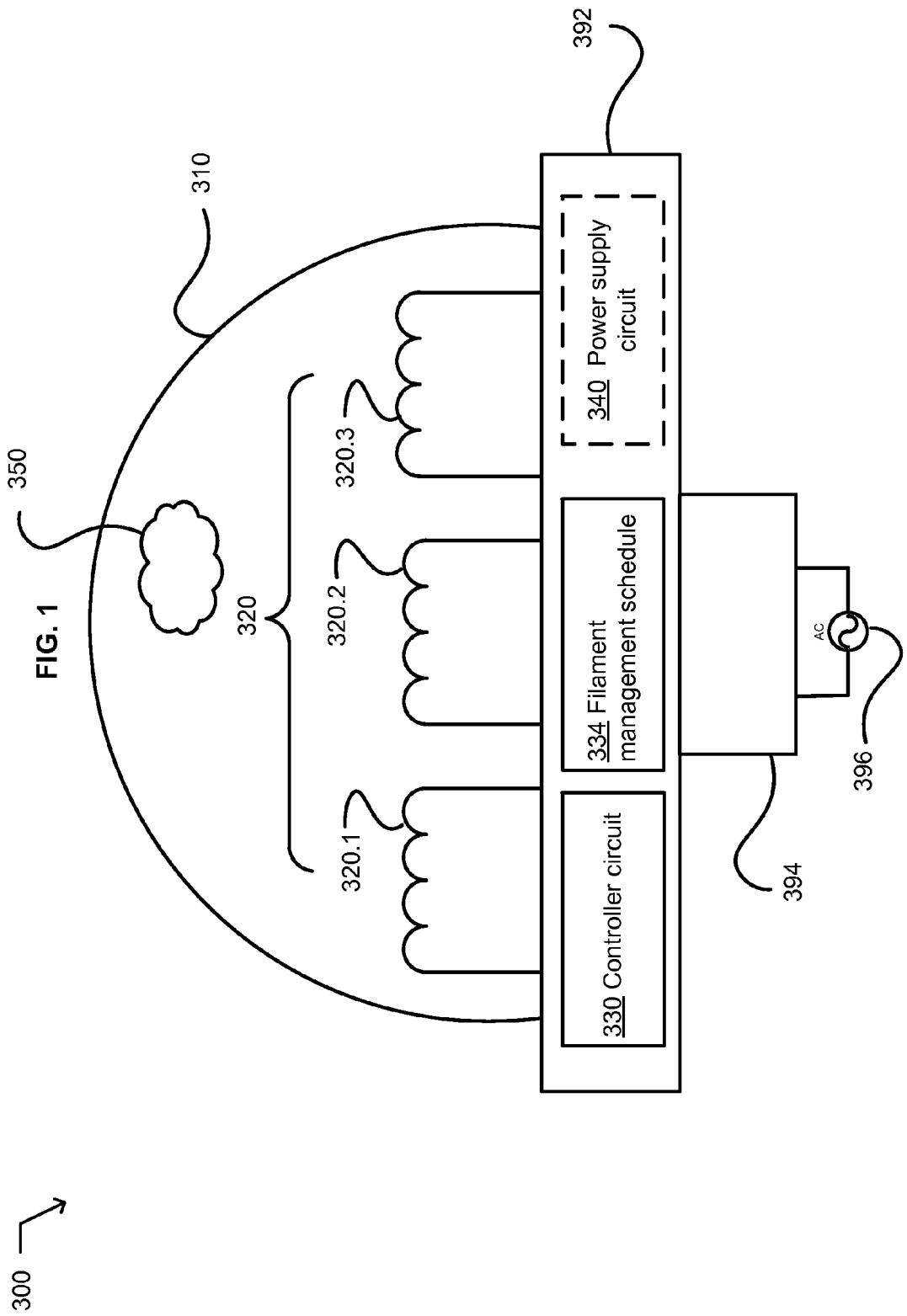
FIG. 1 illustrates an example incandescent lighting system 300.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electric current constructed and arranged to implement various logic functions as described herein. In some implementations, one or more media are configured to bear a device-detectable implementation if such media holds or transmits a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical, as used herein, is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

FIG. 1 illustrates an example incandescent lighting system 300. The system includes a gas filled and sealed glass envelope 310. For example, the sealed glass envelope may be similar to a sealed glass envelope presently used in household incandescent lights. For example, the sealed glass envelope may be similar to a sealed glass envelope presently used in an incandescent spot light, an incandescent signal light, a flashlight, or an automotive headlight. The system includes at least two filaments 320 enclosed within the glass envelope. Each filament of the at least two filaments is configured to generate light in response to a flow of electric current. FIG. 1 illustrates an example of the at least two filaments as a filament 320.1, a filament 320.2, and a filament 320.3. The system includes a controller circuit 330 configured to manage the at least two filaments in response to a filament management schedule 334. The filament management schedule includes managing the respective flow of electric current through each filament of the at least two filaments. In an embodiment, the filament management schedule also includes maintaining a substantially uniform level of light generation by the at least two filaments. In an embodiment, the filament management schedule also includes managing the respective flow of electric current through each filament of the at least two filaments so that not all of the at least two filaments generate light at any one time. In an embodiment, the filament management schedule also includes or is responsive to a plan or process for reaching an objective, including long operation life, high efficiency, uniformity, or economy in the output of light by the incandescent lighting system. In an embodiment, the filament management schedule also includes specifying a sequence, order, or burn time for each filament.

For example, an embodiment of the system 300 may be used in conjunction with high efficiency illumination. Running filaments at a hotter temperature is expected to be more energy efficient by delivering more lumens per watt than conventional filament temperatures presently in use. However, filaments running at hotter temperatures may have shorter lives before burning out or otherwise degrading. An embodiment of the incandescent lighting system 300 is expected to address this situation by enclosing the at least two filaments 320 in the single glass envelope 310, and using the controller circuit 330 to manage the multiple filaments according to a filament management schedule 334 to manage the respective flow of electric current through each filament of the at least two filaments and provide a longer overall useful life of the incandescent light. In an embodiment, the system in a simple form may flow electric current only to filament 320.1 until it ultimately burns out, and then flow electric current to filament 320.2 until it ultimately burns out, and so on until all of the at least two filaments are burned out, whereupon the burned out lighting system or the burned components may be replaced with a new lighting system or new components.

In an embodiment of the system 300, the sealed glass envelope 310 is fixedly attached to a housing 392. In an embodiment, the sealed glass envelope is fixedly attached to a base 394. For example, the base may include a screw-on base typically used in a household incandescent light or light. For example, the base may include a multiple pin-type connection used in a specialty light, such as an automotive headlight. For example, the base may include two base portions. For example, the base may include two electrical conductors configured to make contact with an electrical supply supplying current to the system, illustrated as AC electrical supply 396. In an embodiment, the sealed glass envelope includes a gas 350 filled, sealed glass envelope. In an embodiment, the sealed glass envelope includes a transparent or translucent sealed glass envelope.

In an embodiment of the system 300, the at least two filaments 320 include at least two tungsten filaments. In an embodiment, the at least two filaments include at least two wire filaments. In an embodiment, a first filament of the at least two filaments generates visible light having a first feature and a second filament of the at least two filament generates visible light having a second feature. For example, the first filament may have a first color temperature and the second filament may have a second color temperature. For example, the first filament may generate light having a first quality and the second filament may generate light having a second quality. In an embodiment, each filament can be switched on and off more than once over its lifetime. In an embodiment, each filament of the at least two filaments is configured to generate visible light in response to a flow of electric current.

In an embodiment of the system 300, the controller 330 is enclosed within the glass envelope 310. In an embodiment, the controller is enclosed within the housing 392. In an embodiment, the controller is located external of the glass envelope. For example, the controller may be located in a socket electrically and physically positioned (not illustrated) between a base 394 and the electrical supply 396. For example, the controller may be located apart from the glass envelope, such as on a nearby wall, and communicate with the incandescent light. In an embodiment, the controller is configured to automatically and without human intervention manage the respective flow of electric current through each filament of the at least two filaments 320.

In an embodiment of the system 300, the filament management schedule 334 includes switching the flow of electric current from a first filament to a second filament of the at least two filaments 320. In an embodiment, the filament management schedule includes modulating the respective flow of electric current through each filament of the at least two filaments. In an embodiment, the filament management schedule includes a time-interval of flow of electric current through each filament of the at least two filaments. For example, a time interval may include one minute, one hour, 12 hours, a day, or two days. In an embodiment, the filament management schedule includes modifying the time-interval of a flow of electric current through a filament of the at least two filaments in response to a burn out of a filament of the at least two filaments. In an embodiment, the filament management schedule includes managing the respective flow of electric current through each filament of the at least two filaments in response to a schedule that re-burns each filament of the at least two filaments after each of them had been burned once, with a shorter burn cycle being employed for each filament for each subsequent iteration. It is anticipated that this schedule would continue for a modest number of burn cycles, with the ever-more-frequent safety-net operations alerting the user to the fact that the bulb's filament-system (the at least two filaments) is approaching the end of its service-life. For example, this schedule may be configured so that the management schedule would go around the at least two filaments many times, not just once (though not so many times as to make thermal-cycling fatigue an issue).

In an embodiment of the system 300, the filament management schedule 334 includes managing the respective flow of electric current through each filament of the at least two filaments 320 in response to the filament management schedule 334 activating each filament for a desired fraction of an estimated total operating life of the incandescent lighting system. In an embodiment, the managing the respective flow of electric current includes managing the respective flow of electric current through each filament of the at least two filaments with an objective of obtaining a maximum total life from the at least two filaments. In an embodiment, the managing the respective flow of electric current includes managing the respective flow of electric current through each filament of the at least two filaments with an objective of maintaining a substantially uniform light output from the at least two filaments. In an embodiment, the managing the respective flow of electric current includes managing the respective flow of electric current in an adaptively-learned response to usage patterns of the incandescent lighting system. In an embodiment, the managing the respective flow of electric current includes withdrawing a filament of the at least two filaments from management if a current drawn by the filament in operation increases in a manner indicative of a necking or notching of the filament. For example, in an embodiment, withdrawing a filament from management will permanently shut down the withdrawn filament. In an embodiment, the managing the respective flow of electric current includes withdrawing a filament of the at least two filaments from management if current drawn by the filament in operation increases in a manner indicative of a failing of the filament. In an embodiment, the managing the respective flow of electric current includes withdrawing a filament of the at least two filaments from management if current drawn by the filament in operation increases in a manner indicative of a failing of the filament, and powering up another filament of the at least two filaments keeping the total light output of the incandescent lighting system constant over the transition.

In an embodiment of the system 300, the filament management schedule 334 includes managing the respective flow of electric current through each filament of the at least two filaments 320 in response to an optimization algorithm. For example, the filament management schedule will use a more rugged filament that is resistant to turn-on shock during the daylight hours when more likely to be switched on and off, and use another less rugged filament during night time hours when less likely to be switched on and off. For example, if in a round robin management schedule, it is determined that filament 320.3 is drawing less current than the other filaments 320.1 and 320.2, and it is known from experience that less current draw means filament number 320.3 will last longer, the filament management schedule 334 will increases the fraction of burn time assigned to filament 320.3 to equalize filament life. In an embodiment, the optimization algorithm is configured to minimize burn-out probability of each filament of the at least two filaments. For example, the optimization algorithm may include maximizing the utility of the light, such as maximizing the replacement interval time, optimizing the integrated light output over time, adding a user program selector, or other optimization algorithm preprogramed by manufacturer. For example, the optimization algorithm may include minimizing total power consumed while providing a selected illumination. In an embodiment, the optimization algorithm is configured to maximize the useful life of each filament of the at least two filaments. In an embodiment, the optimization algorithm is configured to maximize the useful life of the incandescent light. For example, the optimization algorithm may be responsive to the type of material(s) used in a filament of the at least two filaments, or may be responsive to the actual voltage of the electrical supply 396. In an embodiment, the managing the respective flow of electric current includes switching each filament on for a set time period. In an embodiment, the managing the respective flow of electric current includes switching each filament on for a set time period, and in a set order. In an embodiment, the managing the respective flow of electric current includes switching each filament on for a random period or in a random order. In an embodiment, the managing the respective flow of electric current includes simultaneously switching on at least two filaments of the at least three filaments enclosed within the glass envelope, and then simultaneously switching off one of the at least two filaments while switching on another filament of the at least three filaments. In an embodiment, the switching includes simultaneously switching off one of the at least two filaments while switching on another filament of the at least three filaments. In an embodiment, the managing the respective flow of electric current includes responding to an external command or responding to a condition. For example, in response to an external command to dim the lighting system, the managing the respective flow of electric current may include going from two active filaments to one active filament. In an embodiment, the managing the respective flow of electric current includes managing the respective flow of electric current through each filament of the at least two filaments in response to an external condition. For example, an external condition may include ambient temperature, power line voltage, or waveform. For example, an external condition may include a time of day or a usage pattern. In an embodiment, the managing the respective flow of electric current includes managing the respective flow of electric current through each filament of the at least two filaments by varying the current through the at least two filaments and maintaining a constant luminous output as one filament is turned off and another filament is turned on. For example, the electric current may be varied using pulse-width-modulation.

In an embodiment of the system 300, the filament management schedule 334 includes managing the respective flow of electric current through each filament of the at least two filaments 320 so that not all of the at least two filaments are generating light at any one time.

In an embodiment, the managing the respective flow of electric current includes minimizing any human noticeable flickering of the light outputted by the incandescent lighting system. In an embodiment, the managing the respective flow of electric current includes managing the respective flow of electric current through each filament of the at least two filaments to minimize any human noticeable change in brightness or color temperature of the light outputted by the incandescent lighting system.

In an embodiment of the system 300, the controller circuit 330 is further configured to determine if a filament of the at least two filaments 320 has failed, and if so, skip that filament in its management of the at least two filaments. In an embodiment, the controller circuit is further configured to manage short time scale duty cycles of the respective flow of electric current through each filament of the at least two filaments in response to a filament management schedule. In an embodiment, the controller circuit includes current switching elements that are at least partly electromechanical. For example, an at least partial electromechanical switching element may include relay contacts. In an embodiment, the controller circuit includes current switching elements that are at least partly electronic. For example, an at least partially electronic switching element may include a MOSFET or an SCR.

In an embodiment, the system 300 includes a power supply circuit 340 configured to convert electric power supplied to the incandescent light to a voltage or waveform (e.g., DC) suitable for use by the controller circuit. For example, the power supply circuit may include active or passive rectifiers. For example, a conversion of the electric power may include a step-up or a step down of the voltage of the electrical supply 396. For example, a conversion of the electric power may include converting from AC to DC, or from DC to AC. In an embodiment, the voltage or waveform is suitable for use by switching elements (not illustrated) managed by the controller circuit. In an embodiment, the power supply circuit is enclosed within the glass envelope 310 or the housing 392 coupled to the glass envelope. In an embodiment, the power supply circuit is further configured to supply a particular current to a filament of the at least two filaments in response to the filament management schedule. In an embodiment, the supplied particular current includes a dynamically regulated current. In an embodiment, the supplied particular current includes a current having a particular waveform.

In an embodiment, the controller circuit 330 is further configured to test a filament of the at least two filaments in response to the filament management schedule. In an embodiment, the test includes applying a test protocol. In an embodiment, the test includes monitoring a voltage applied to or a current passing through a filament of the at least two filaments. In an embodiment, the controller is further configured to estimate the light generated by the filament in response to the test of the filament. In an embodiment, the controller is further configured to adjust the passage of current through the filament to modify the light generated by the filament in response to the estimate of the light generated. In an embodiment, the controller circuit is further configured to predict an incipient failure of a filament in response to the test of a filament, and to modify the filament management schedule in response to the prediction. In an embodiment, the modification of the filament management schedule includes modifying the next switch-on period for the filament to be for a shorter interval. In an embodiment, the modification of the filament management schedule includes removing the filament from the filament management.

Figure 2:
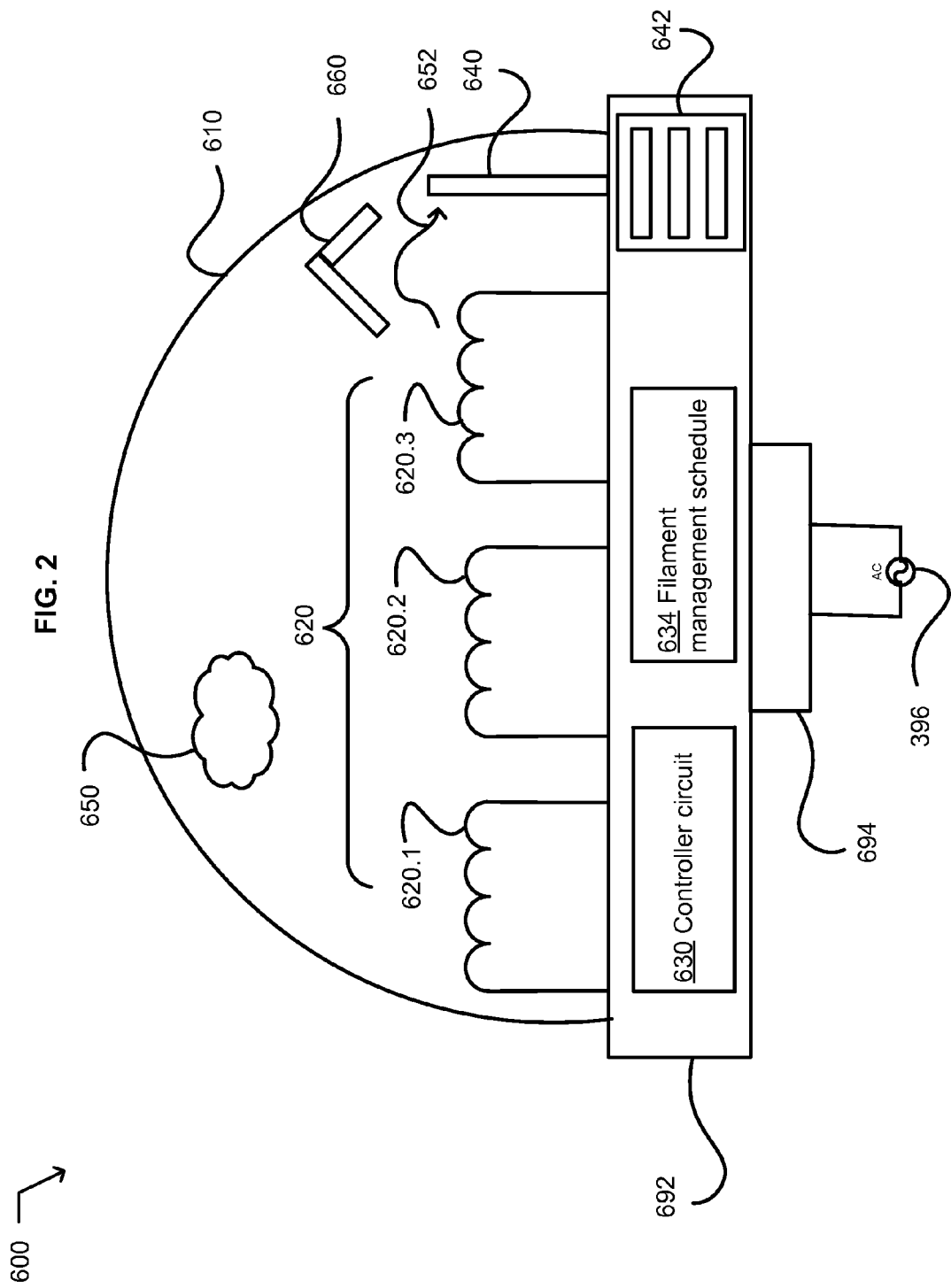
FIG. 2 illustrates an example incandescent lighting system 600.

FIG. 2 illustrates an example incandescent lighting system 600. The example system includes a gas 650 filled and sealed glass envelope 610. The system includes at least two filaments 620 enclosed within the glass envelope. The at least two filaments are illustrated as a first filament 620.1, a second filament 620.2, and a third filament 620.3. Each filament of the at least two filaments is configured to generate light in response to a flow of electric current. The system includes a controller circuit 630 configured to manage the at least two filaments in response to a filament management schedule 634. The filament management schedule includes managing a respective flow of electric current through each filament of the at least two filaments. The system includes an accumulation element 640 enclosed within the glass envelope and structured to facilitate deposition thereon of material evaporated by at least one filament of the at least two filaments. For example, material evaporated may include material vaporized or released by at least one filament during its generation of light. In an embodiment, the system includes a housing 692. In an embodiment, the system includes a base 694.

In an embodiment, the accumulation element 640 is located within the glass envelope 610 at a position so that its temperature during operation of the system 600 is typically less than a temperature of a filament generating light of the at least two filaments 620. In an embodiment, the system includes a heat sink 642. In an embodiment, the accumulation element is thermally coupled with a heat sink. In an embodiment, the heat sink includes a thermally conductive portion of the bulb housing 692 fixedly attached to the glass envelope. In an embodiment, the thermally conductive base includes a metallic or other similarly thermally conductive component. In an embodiment, the accumulation element is located within the glass envelope at an intended operating elevation or orientation at least as high as a filament generating light in a first operating orientation. For example, an intended operating elevation or orientation may include base down, base up, or base horizontal elevation or position.

In an embodiment, the system includes a flow directing element 660 enclosed within the glass envelope 610 and structured to urge a flow 652 of heated gas 650 and material evaporated from a filament toward the accumulation element. In an embodiment, the flow directing element is structured to facilitate a preferential deposition on the accumulation element of material evaporated from at least one filament of the at least two filaments over other components enclosed within the glass envelope. In an embodiment, the flow directing element is structured to facilitate a preferential deposition on the accumulation element of material evaporated from at least one filament of the at least two filaments over the glass envelope. In an embodiment, the flow directing element is at least semi-transparent. In an embodiment, the flow directing element is structured to direct a convective flow of the gas filling the glass envelope toward the accumulation element. In an embodiment, the flow directing element is structured to direct a convective flow of the gas filling the glass envelope toward the accumulation element so that material evaporated from the filaments is preferentially deposited on the accumulation element. For example, the preferential deposition is anticipated to facilitate a majority of the bulb surface remaining substantially free of deposited filament material.

In an embodiment, the filament management schedule 634 further includes maintaining a substantially uniform level of light generation by the at least two filaments 620. In an embodiment, the filament management schedule further includes managing the respective flow of electric current through each filament of the at least two filaments so that not all of the at least two filaments generate light at any one time.

FIG. 3 illustrates an example operational flow 500. After a start operation, the operational flow includes a first lighting operation 510. The first lighting operation includes electronically initiating in response to a filament management schedule a first electric current flow through a first filament enclosed within a sealed glass envelope of an incandescent light and generating a first light. In an embodiment, the first lighting operation may be implemented by the controller circuit 330 flowing an electric current through filament 320.1 of the incandescent lighting system 300 in response to the filament management schedule 334 as described in conjunction with FIG. 1. A first extinguishing operation 515 includes electronically terminating the first electric current flow in response to the filament management schedule. In an embodiment, the first extinguishing operation may be implemented by the controller circuit stopping the flow of electric current through filament 320.1 in response to the filament management schedule 334 of the incandescent lighting system 300 as described in conjunction with FIG. 1. A second lighting operation 520 includes electronically initiating in response to the filament management schedule a second electric current flow through a second filament enclosed within the sealed glass envelope and generating a second light. In an embodiment, the second lighting operation may be implemented by the controller circuit 330 flowing a second electric current through filament 320.2 of the incandescent lighting system 300 described in conjunction with FIG. 1. A first transition operation 525 includes electronically maintaining a substantially uniform level of light generated by the incandescent light. In an embodiment, the first transition operation may be implemented using the controller circuit 330. The operational flow includes an end operation.

In an embodiment, the first transition operation 525 includes electronically managing 527 the terminating the first electric current flow and the initiating the second electric current flow to result in the substantially uniform level of light generated by the incandescent light. In an embodiment, the operational flow 500 includes electronically managing 529 the respective flow of electric current through each filament of the incandescent light so that not all of the filaments are generating light at any one time.

FIG. 4 illustrates an alternative embodiment of the operational flow 500 described in conjunction with FIG. 3. A second extinguishing operation 530 includes electronically terminating the second electric current flow in response to the filament management schedule. In an embodiment, the second extinguishing operation may be implemented by the controller circuit 330 stopping the flow of electric current through filament 320.2 in response to the filament management schedule 334 of the incandescent lighting system 300 described in conjunction with FIG. 1. A third lighting operation 535 includes electronically initiating the first electric current flow through the first filament in response to the filament management schedule and generating the first light. A second transition operation 540 includes electronically managing the terminating the second electric current flow and the initiating the first electric current flow to result in the substantially uniform level of light generated by the incandescent light. In an embodiment, the second transition operation may be implemented using the controller circuit 330. In an embodiment, the second transition operation includes managing the terminating the second electric current flow and the initiating the first electric current flow so that change over from the second light to the first light does not generate a human-perceivable substantial change in light generated by the incandescent light.

FIG. 5 illustrates an alternative embodiment of the operational flow 500 described in conjunction with FIG. 3. A second extinguishing operation 550 includes electronically terminating the second electric current flow in response to the filament management schedule. A third lighting operation 555 includes electronically initiating a third electric current flow through a third filament enclosed within the sealed glass envelope in response to the filament management schedule and generating a third light. A second transition operation 560 includes electronically managing the terminating the second electric current flow and the initiating the third electric current flow to result in the substantially uniform level of light generated by the incandescent light. A third extinguishing operation 565 includes electronically terminating the third electric current flow in response to the filament management schedule. A fourth lighting operation 570 includes electronically initiating the first electric current flow through the first filament in response to the filament management schedule and generating the first light. A third transition operation 575 includes electronically managing the terminating the third electric current flow and the initiating the first electric current flow to result in the substantially uniform level of light generated by the incandescent light.

FIG. 6 illustrates an alternative embodiment of the operational flow 500 described in conjunction with FIG. 3. A first deposition operation 580 includes depositing a first material evaporated by the first filament onto a first accumulation element enclosed within the sealed glass envelope. In an embodiment, the first deposition operation may be implemented by the accumulation element 640 described in conjunction with FIG. 2. A second deposition operation 585 includes depositing a second material evaporated by the second filament onto the second accumulation element enclosed within the sealed glass envelope. In an embodiment, the second deposition operation may be implemented by the accumulation element 640 described in conjunction with FIG. 2, or another accumulation element not illustrated by FIG. 2.

In an embodiment, the operational flow 500 may include a first movement operation 590. The movement operation includes flowing the first material toward the first accumulation element. In an embodiment, the movement operation may be implemented by the flow directing element 660 described in conjunction with FIG. 2. In an embodiment, the flowing a first material includes convectively flowing the first material. A second movement operation 595 includes flowing the second material toward the second accumulation element. In an embodiment, the flowing a second material includes convectively flowing the second material. In an embodiment, the first accumulation element and the second accumulation element are a same accumulation element. In an embodiment, the first accumulation element and the second accumulation element are substantially different accumulation elements.

Figure 7:
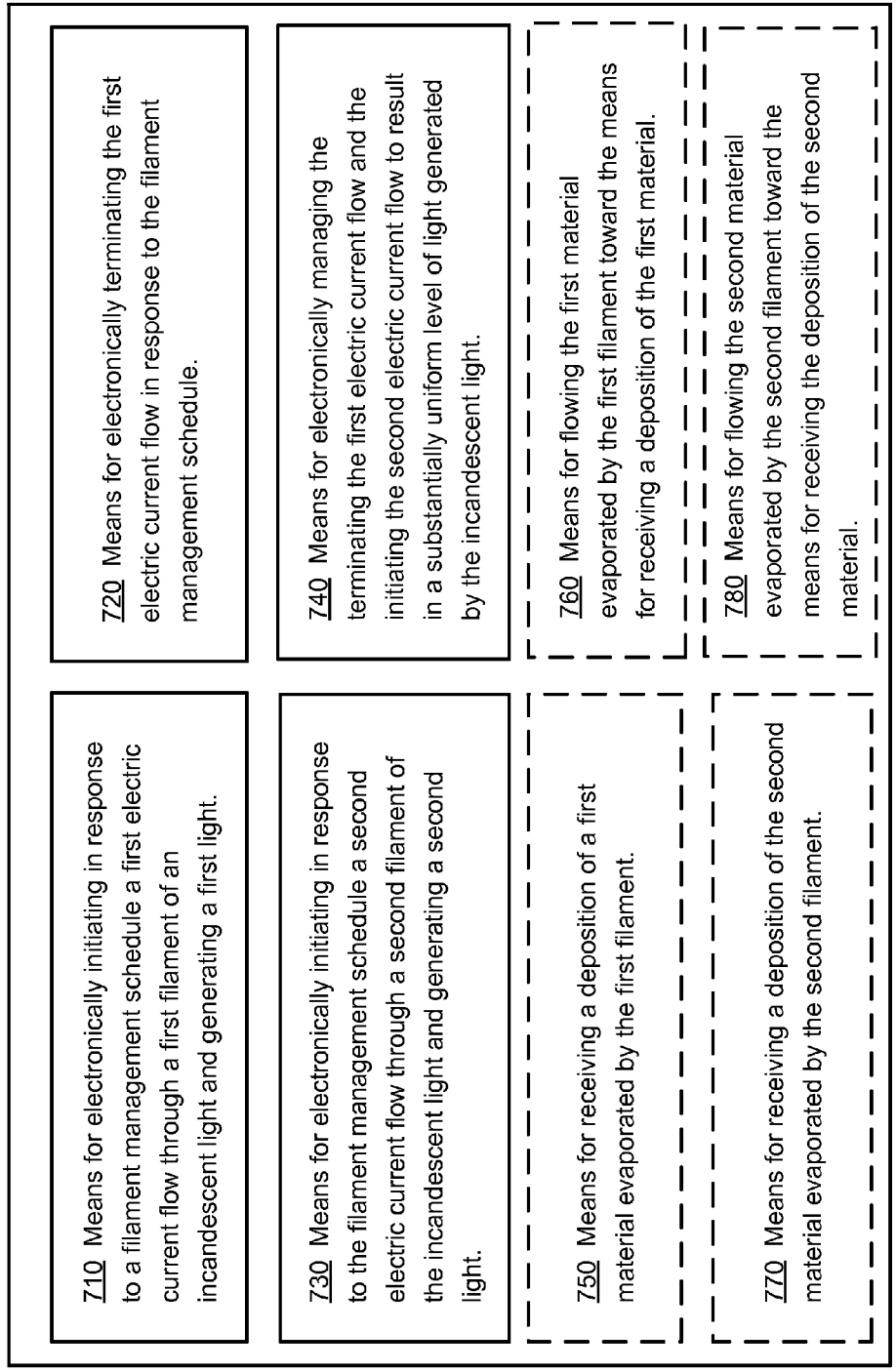
FIG. 7 illustrates a system 700.

FIG. 7 illustrates a system 700. The system includes means 710 for electronically initiating in response to a filament management schedule a first electric current flow through a first filament of an incandescent light and generating a first light. The system includes means 720 for electronically terminating the first electric current flow in response to the filament management schedule. The system includes means 730 for electronically initiating in response to the filament management schedule a second electric current flow through a second filament of the incandescent light and generating a second light. The system includes means 740 for electronically managing the terminating the first electric current flow and the initiating the second electric current flow to generate a substantially uniform level of light generation by the incandescent light.

In an embodiment, the system includes means 750 for receiving a deposition of a first material evaporated by the first filament. In an embodiment, the system includes means 760 for flowing the first material evaporated by the first filament toward the means for receiving a deposition of the first material. In an embodiment, the system includes means 770 for receiving a deposition of the second material evaporated by the second filament. In an embodiment, the system includes means 780 for flowing the second material evaporated by the second filament toward the means for receiving the deposition of the second material. In an embodiment, the means for receiving a deposition of the first material and the means for receiving a deposition of the second material are included in a single means for receiving a deposition of evaporated material.

Figure 8:
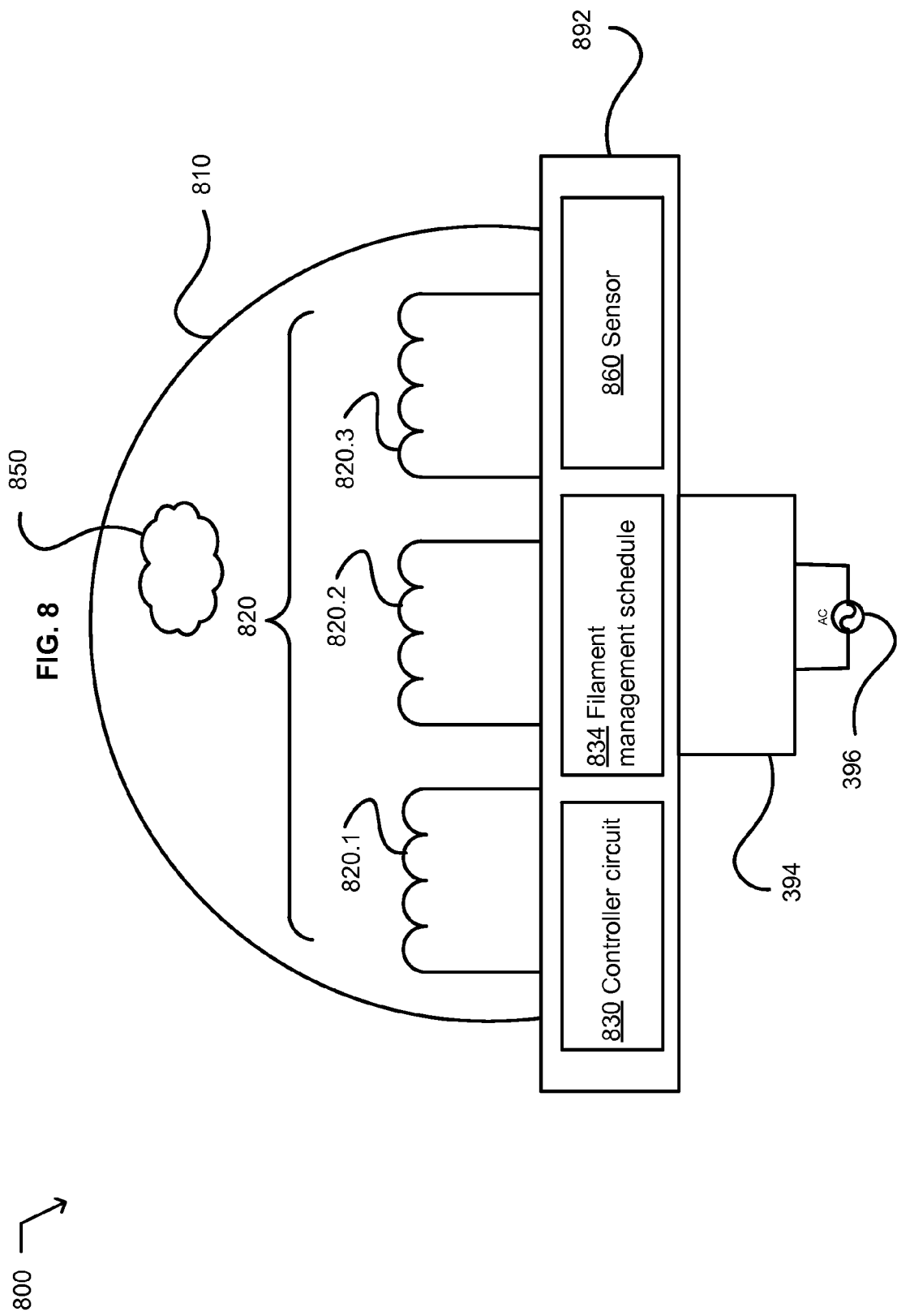
FIG. 8 illustrates an example incandescent lighting system 800.

FIG. 8 illustrates an example incandescent lighting system 800. The system includes a gas 850 filled glass envelope 810. The system includes at least two filaments 820 enclosed within the glass envelope. The at least two filaments are illustrated as a filament 820.1, a filament 820.2, and a filament 820.3. Each filament of the at least two filaments is configured to generate visible light in response to a flow of electric current. The system includes a sensor 860 configured to detect an aspect of a filament of the at least two filaments and to generate a sensor signal indicative of the aspect. The system includes a controller circuit 830 configured to manage the at least two filaments in response to a filament management schedule 834. The filament management schedule includes adjusting a flow of electric current through a filament of the at least two filaments in response to the sensor signal.

In an embodiment, the sensor 860 is located external of the glass envelope 810. For example, the sensor may be mounted on a structure proximate to the glass envelope, and configured to communicate with the controller via the electrical supply 396. For example, the sensor may be mounted on a structure proximate to the glass envelope, and configured to communicate with the controller 830 via a wireless link. In an embodiment, the sensor is enclosed within the glass envelope. In an embodiment, the sensor is configured to detect a current flow through a filament of the at least two filaments 820. In an embodiment, the sensor is configured to optically evaluate or measure light generated by a filament of the at least two filaments. In an embodiment, the sensor is configured to detect a temperature of a filament of the at least two filaments. In an embodiment, the sensor is configured to detect a condition of a filament of the at least two filaments. For example, a condition may include an increasing or decreasing color temperature, or a flickering or flaring of light generated by a filament.

In an embodiment of the filament management schedule 834, the adjusting the respective flow of electric current includes adjusting the flow of electric current through a filament of the at least two filaments 820 in response to a sensor signal indicative of a condition of each filament of the at least two filaments. For example, the adjustment may be to maintain a uniform light generation, or to equalize a projected time remaining until burnout of one or more of the at least two filaments. In an embodiment, the adjusting the respective flow of electric current includes managing the flow of electric current through a filament of the at least two filaments in response to a sensor signal indicative of a condition of each filament of the at least two filaments.

In an embodiment, the sensor 860 is configured to detect a characteristic of the at least two filaments 820 in combination. For example, a light output or a current draw. In an embodiment, the adjusting the respective flow of electric current includes adjusting the respective flow of electric current through each filament of the at least two filaments in response to the sensor signal indicative of the detected characteristic of the at least two filaments in combination.

In an embodiment, the filament management schedule 834 includes maintaining a substantially uniform level of light generation by the at least two filaments 820. In an embodiment, the filament management schedule includes managing the respective flow of electric current through each filament of the at least two filaments. In an embodiment, the filament management schedule further includes visually signaling a condition of the incandescent lighting system by temporarily altering light generation of a filament. For example, blinking a filament, such as in a pattern, or in a particular sequence. For example, the visually signaling may include blinking an active filament when the lighting system is approaching the end of its useful life—for example, thus doing visually what a smoke detector does audibly by beeping every five seconds when its batteries are nearing discharge. In an embodiment, the filament management schedule includes managing the respective flow of electric current through each filament of the at least two filaments so that not all of the at least two filaments are generating light at any one time.

In an embodiment, the controller circuit 830 is further configured to output an electronic signal indicative of a condition of the incandescent lighting system 800.

In an embodiment, the sensor 860 is configured to detect a blue-shifted spectral content of light generated by a filament of the at least two filaments 820. For example, a blue-shifted spectral content may be indicative of a growing filament hot-spot, or other indicia of filament deterioration. In an embodiment, the adjusting the respective flow of electric current includes adjusting the respective flow of electric current through each filament of the at least two filaments in response to the sensor signal indicative of the detected blue-shifted spectral content. For example, the filament management schedule adjusts its selection of filaments to activate, typically, irreversibly by switching operation to another filament.

Figure 9:
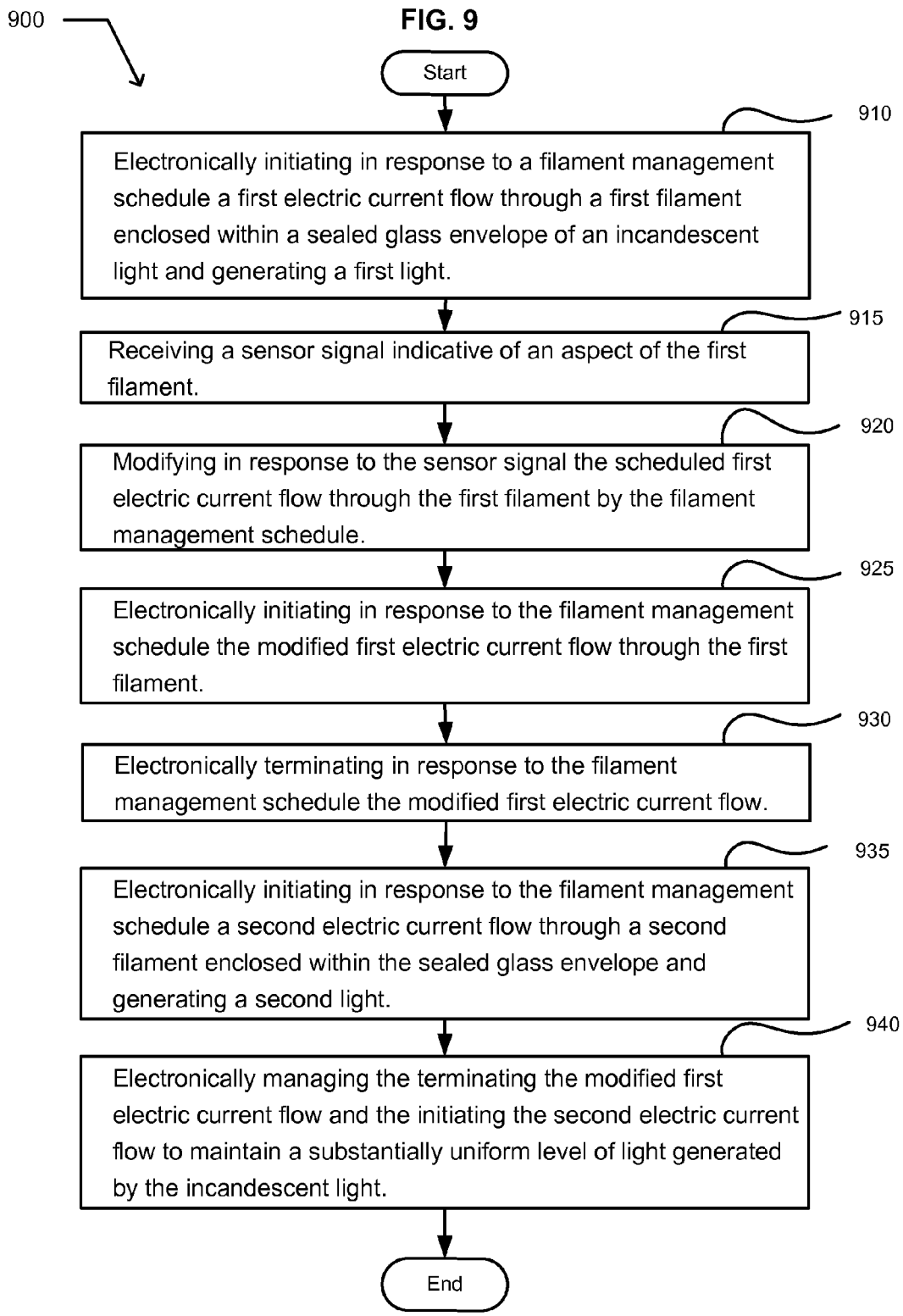
FIG. 9 illustrates an example operational flow 900.

FIG. 9 illustrates an example operational flow 900. After a start operation, the operational flow includes a first lighting operation 910. The first lighting operation includes electronically initiating in response to a filament management schedule a first electric current flow through a first filament enclosed within a sealed glass envelope of an incandescent light and generating a first light. In an embodiment, the first lighting operation may be implemented by the controller circuit 830 flowing a first electrical current through the filament 820.1 of the incandescent lighting system 800 in response to the filament management schedule 834 described in conjunction with FIG. 8. A receiving operation 915 includes receiving a sensor signal indicative of an aspect of the first filament. For example, the aspect of the first filament may include an indication that light output by the first filament has increased or diminished over time. In an embodiment, the receiving operation may be implemented by the controller circuit 830 receiving the sensor signal from the sensor 860 described in conjunction with FIG. 8. A rescheduling operation 920 includes modifying in response to the sensor signal the scheduled first electric current flow through the first filament by the filament management schedule. For example, the modifying may include decreasing the first current flow if light generated by the first filament exceeds a target, or may include increasing the first current flow if light generated by the first filament is below the target. In an embodiment, the rescheduling operation may be implemented by the controller circuit 830 described in conjunction with FIG. 8. A modified first lighting operation 925 includes electronically initiating in response to the filament management schedule the modified first electric current flow through the first filament. A first extinguishing operation 930 includes electronically terminating in response to the filament management schedule the modified first electric current flow. In an embodiment, the first extinguishing operation may be implemented by the controller circuit 830 terminating the modified first electrical current through filament 820.1 in response to the filament management schedule 834 described in conjunction with FIG. 8. A second lighting operation 935 includes electronically initiating in response to the filament management schedule a second electric current flow through a second filament enclosed within the sealed glass envelope and generating a second light. In an embodiment, the first extinguishing operation may be implemented by the controller circuit 830 flowing a second electrical current through the filament 820.2 in response to the filament management schedule 834. A first transition operation 940 includes electronically managing the terminating of the modified first electric current flow and the initiating the second electric current flow to maintain a substantially uniform level of light generated by the incandescent light. In an embodiment, the first transition operation may be implemented by the controller circuit 830 managing the first extinguishing operation and the second lighting operation. The operational flow includes an end operation.

In an embodiment, the operational flow 900 includes electronically maintaining a substantially uniform level of light generated by the incandescent light. In an embodiment, the operational flow includes electronically managing the respective flow of electric current through each filament of the incandescent light so that not all of the filaments are generating light at any one time.

Figure 10:
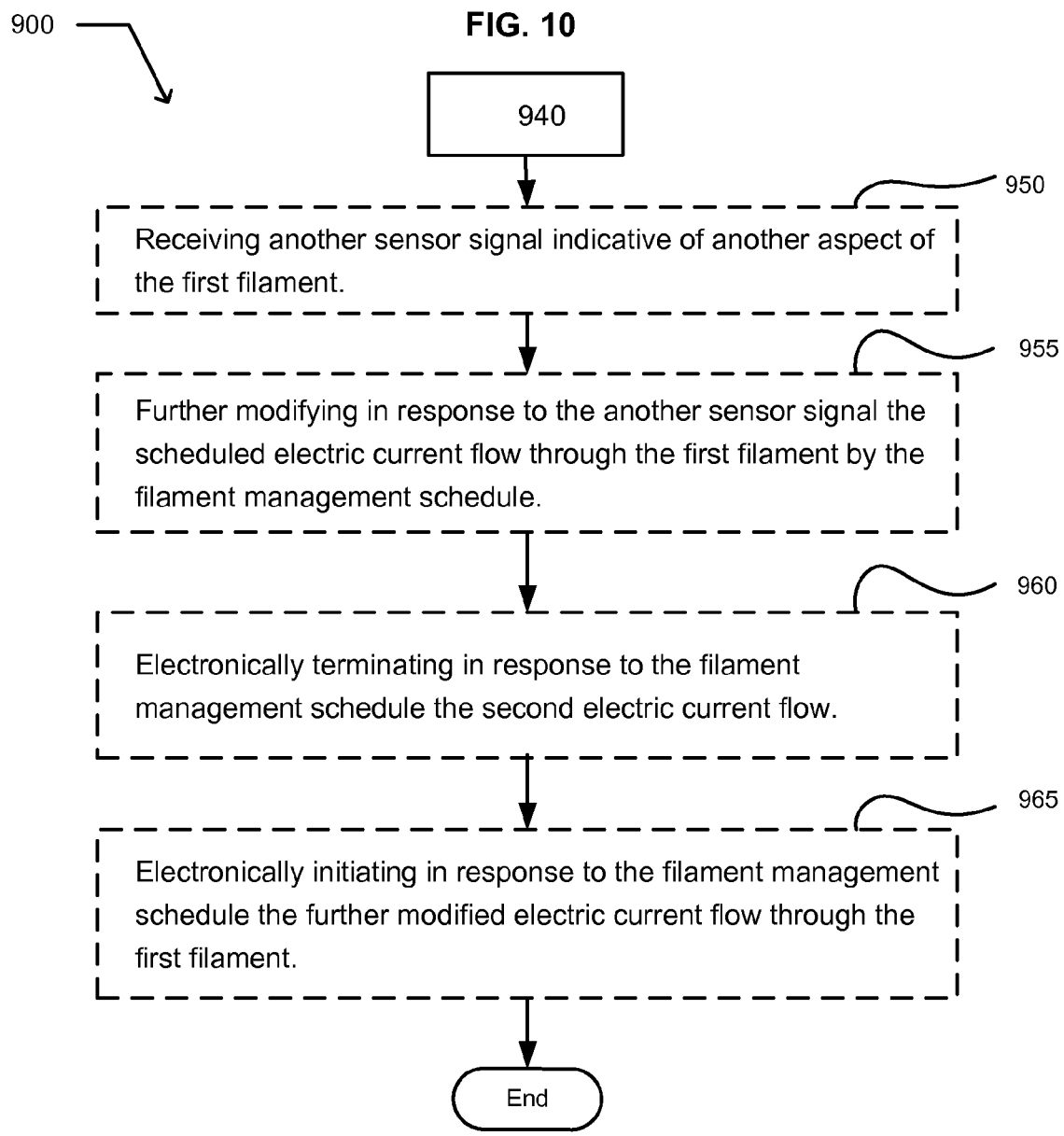
FIG. 10 illustrates an alternative embodiment of the operational flow 900 described in conjunction with FIG. 9.

FIG. 10 illustrates an alternative embodiment of the operational flow 900 of FIG. 9. An operation 950 includes receiving another sensor signal indicative of another aspect of the first filament. An operation 955 includes further modifying in response to the another sensor signal the scheduled electric current flow through the first filament by the filament management schedule. An operation 960 includes electronically terminating in response to the filament management schedule the second electric current flow. An operation 965 includes electronically initiating in response to the filament management schedule the further modified electric current flow through the first filament.

Figure 11:
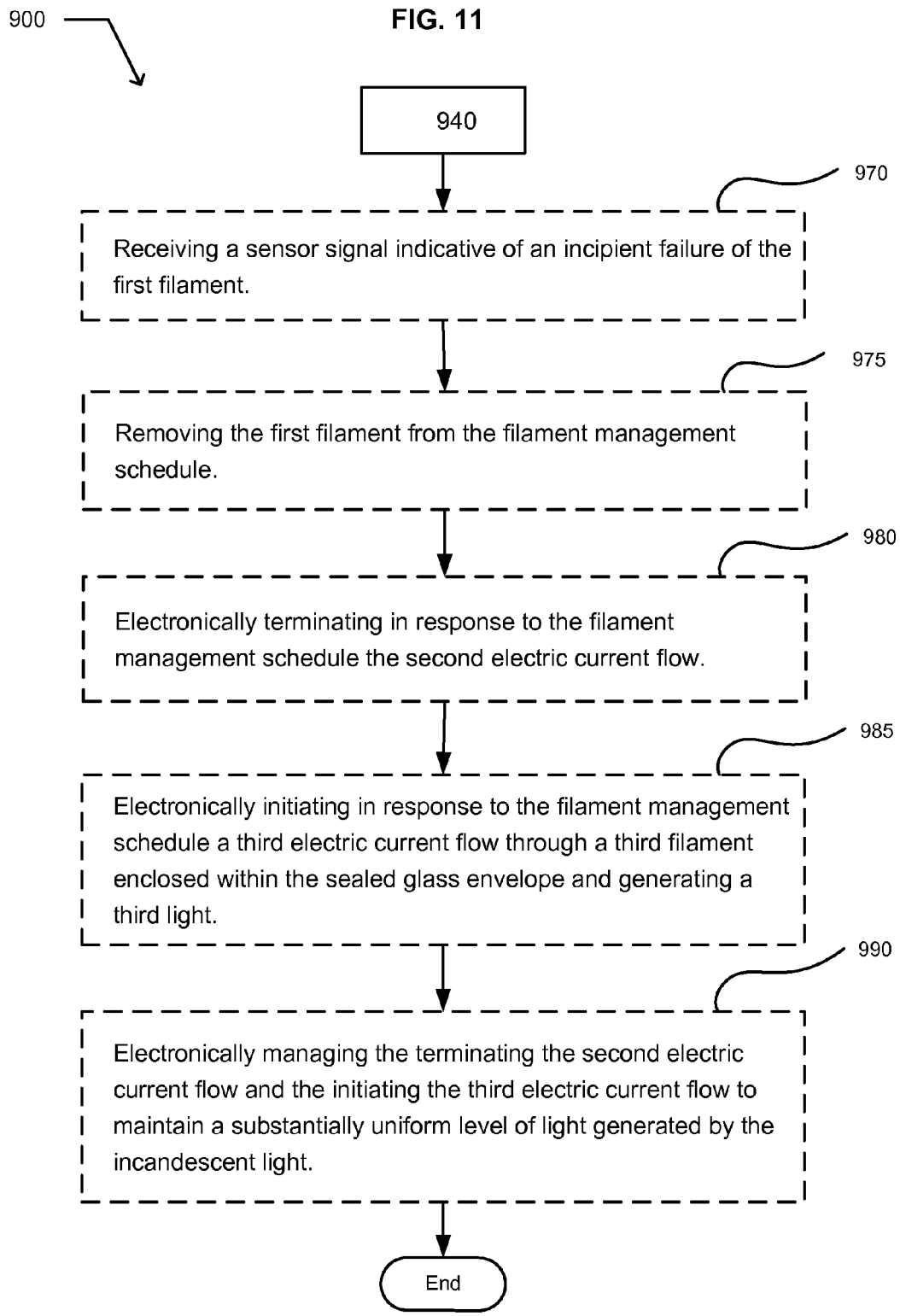
FIG. 11 illustrates alternative embodiments of the operational flow 900 described in conjunction with FIG. 9.

FIG. 11 illustrates alternative embodiments of the operational flow 900 of FIG. 9. An operation 970 includes receiving a sensor signal indicative of an incipient failure of the first filament. An operation 975 includes removing the first filament from the filament management schedule. An operation 980 includes electronically terminating the second electric current flow in response to the removing of the second filament from the filament management schedule. An operation 985 includes electronically initiating in response to the filament management schedule a third electric current flow through a third filament enclosed within the sealed glass envelope and generating a third light. An operation 990 includes electronically managing the terminating the second electric current flow and the initiating the third electric current flow to maintain a substantially uniform level of light generated by the incandescent light.

Figure 12:
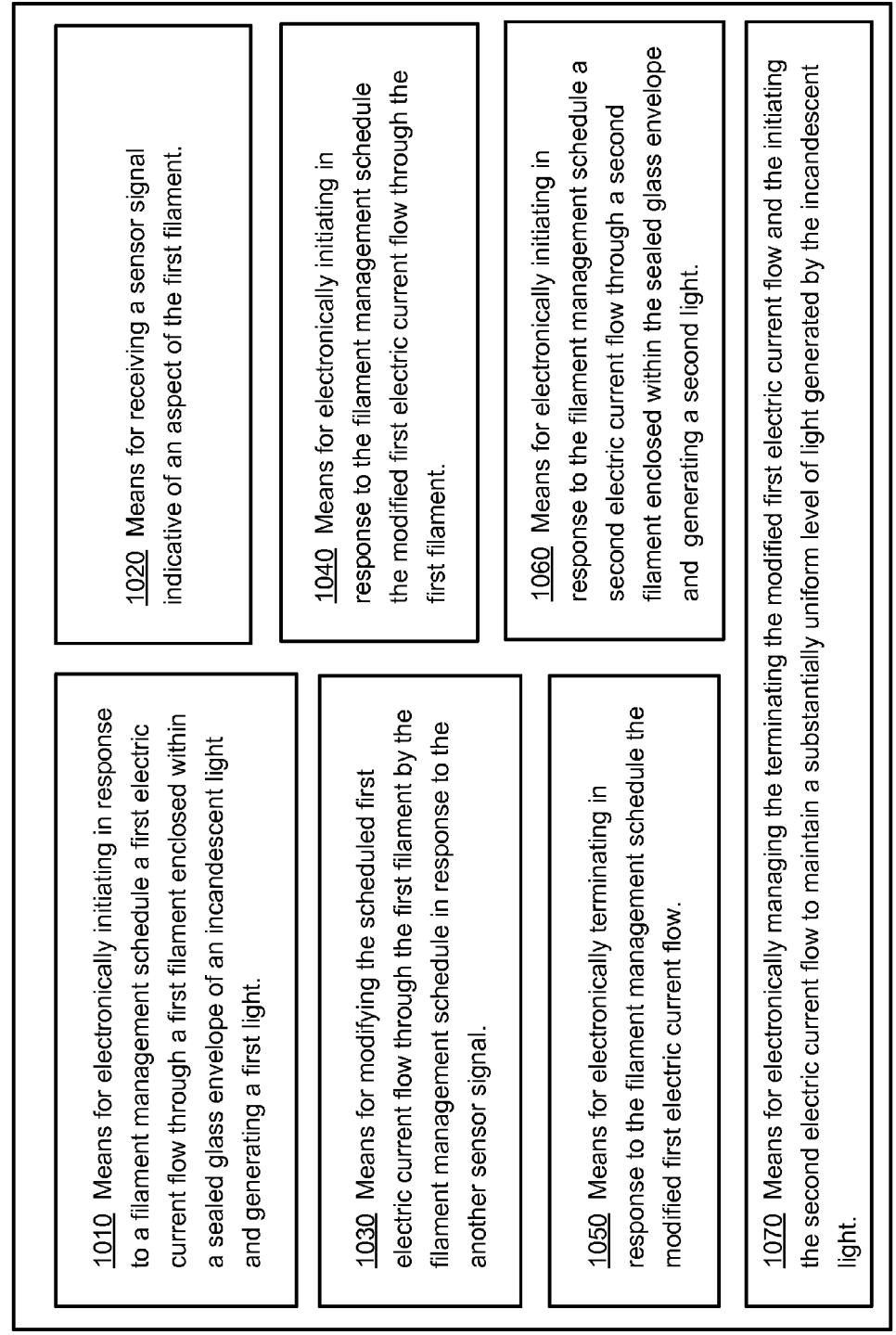
FIG. 12 illustrates an example system 1000.

FIG. 12 illustrates an example system 1000. The example system includes means 1010 for electronically initiating in response to a filament management schedule a first electric current flow through a first filament enclosed within a sealed glass envelope of an incandescent light and generating a first light. The system includes means 1020 for receiving a sensor signal indicative of an aspect of the first filament. The system includes means 1030 for modifying the scheduled first electric current flow through the first filament by the filament management schedule in response to the received another sensor signal. The system includes means 1040 for electronically initiating in response to the filament management schedule the modified first electric current flow through the first filament. The system includes means 1050 for electronically terminating in response to the filament management schedule the modified first electric current flow. The system includes means 1060 for electronically initiating in response to the filament management schedule a second electric current flow through a second filament enclosed within the sealed glass envelope and generating a second light. The system includes means 1070 for electronically managing the terminating the first electric current flow and the initiating the second electric current flow to maintain a substantially uniform level of light generated by the incandescent light.

Figure 13:
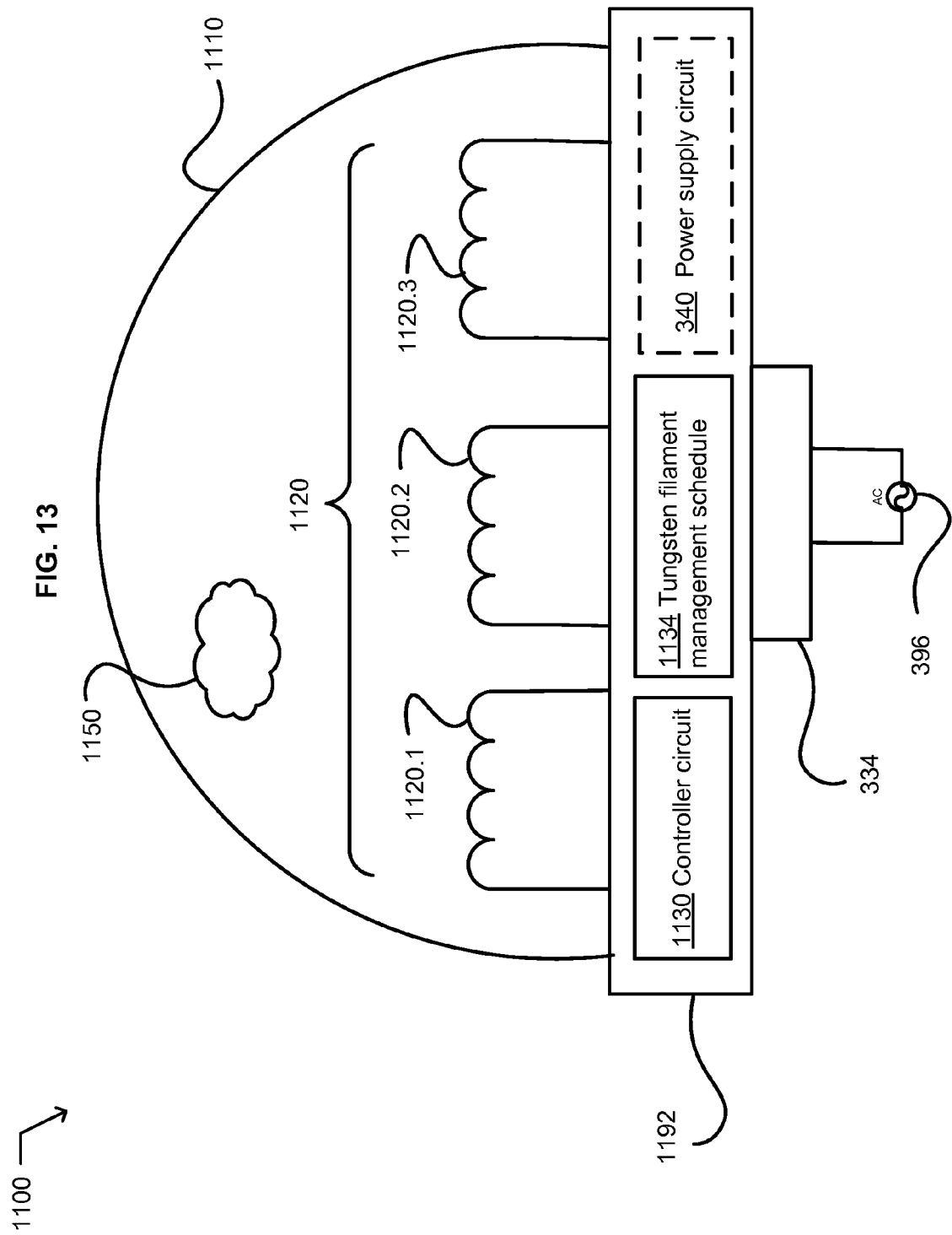
FIG. 13 illustrates an example tungsten-halogen lighting system 1100.

FIG. 13 illustrates an example tungsten-halogen lighting system 1100. The system includes a sealed glass envelope 1110 containing a halogen gas 1150. The system includes at least two tungsten filaments 1120 enclosed within the glass envelope. Each tungsten filament of the at least two tungsten filaments is configured to generate light in response to a flow of electric current. The at least two tungsten filaments are illustrated as a tungsten filament 1120.1, a tungsten filament 1120.2, and a tungsten filament 1120.3. The system includes a controller circuit 1130 configured to manage the at least two tungsten filaments in response to a tungsten filament management schedule 1134. The tungsten filament management schedule includes controlling tungsten redeposition by the halogen regenerative cycle on each tungsten filament of the at least two tungsten filaments.

For example, a tungsten-halogen light is typically filled with an inert gas (such as nitrogen, argon, krypton, or xenon) and a minute amount of a halogen compound (usually hydrogen bromide; HBr) and trace levels of molecular oxygen. In the tungsten-halogen light, the halogen compound serves to initiate a reversible chemical reaction with tungsten evaporated from a filament to yield gaseous tungsten oxyhalide molecules in the vapor phase. Thermal gradients formed as a result of the temperature differential between the hot filament and the cooler envelope contribute to interception and recycling of tungsten to the light filament through a phenomenon known as the halogen regenerative cycle. Vaporized tungsten reacts with hydrogen bromide to form gaseous halides that are subsequently re-deposited onto cooler areas of the filament rather than being slowly accumulated on the inner walls of the envelope.

The halogen regenerative cycle includes three steps. At the start of operation, the light's glass envelope, fill gas, vaporous halogen, and filament all are initially in equilibrium at room temperature. When power is applied to the light, filament temperature rises to its operating temperature (in the vicinity of 2500 to 3000° C.), a process that also heats the fill gas and the glass envelope. Eventually, the envelope achieves its stable operating temperature, which ranges from 400 to 1000° C., depending upon the light parameters. The temperature differential between the filament and the glass envelope creates thermal gradients and convection currents in the fill gas. Once the glass envelope reaches a temperature of approximately 200 to 250° C. (depending on the nature and amount of halogen vapor), the halogen regenerative cycle begins. Tungsten atoms evaporated from a filament react with gaseous halogen vapor and the trace levels of molecular oxygen to form tungsten oxyhalides. Instead of condensing on the hot inner walls of the glass envelope, the oxyhalide compounds are circulated by convection currents back to the region surrounding a filament where they decompose, leaving elemental tungsten re-deposited on the cooler regions of the filament. Once free of combined tungsten, the oxygen and halide compounds diffuse back into vapor and repeat the regenerative cycle. Continuous recycling of metallic tungsten back and forth between the vapor phase and a filament maintains a sufficient filament wire thickness.

In an embodiment, the glass envelope 1100 includes a quartz glass envelope. In an embodiment, the glass envelope includes a high-melting-point glass envelope. In an embodiment, the at least two tungsten filaments 1120 include at least two tungsten wire filaments. In an embodiment, the halogen gas includes an iodine gas. In an embodiment, the halogen gas includes a bromide gas. In an embodiment, the halogen gas includes halogen gas molecules having a chemical structure forming tungsten oxyhalide and promoting scavenging of tungsten material evaporated from the at least two filaments. In an embodiment, the at least two tungsten filaments are arranged within the glass envelope so that tungsten evaporated from a first filament is available for scavenging by a second filament of the at least two filaments. In an embodiment, the at least two tungsten filaments are symmetrically arranged within the glass envelope. In an embodiment, the halogen regenerative cycle includes depositing tungsten evaporated from a first tungsten filament onto a second tungsten filament of the at least two tungsten filaments. In an embodiment, the at least two tungsten filaments are structured and arranged within the glass envelope to facilitate tungsten redeposition by the halogen regenerative cycle across the at least two tungsten filaments. For example, tungsten evaporated from the first filament 1120.1 during a previous light generation is likely to be substantially replaced by the halogen regenerative cycle with tungsten evaporated from the second filament 1120.2 when the first filament subsequently generates light. In an embodiment, the at least two tungsten filaments are structured and arranged within the glass envelope so that tungsten evaporated from a first filament during a previous light generation is likely on average to be substantially replaced with tungsten evaporated from a second filament by the halogen regenerative cycle when the first filament subsequently generates light.

In an embodiment, the controlling tungsten redeposition of the tungsten filament management schedule 1134 includes applying a light-production duty cycle to a filament of the at least two filaments 1120. For example, applying a light-production duty cycle is expected to limit burn time which correspondingly limits tungsten regeneration on the burning filament. In an embodiment, the light-production duty cycle includes a fixed period of time. For example, the fixed period of time may be an hour, a day, a week, a month, or some multiple thereof. In an embodiment, the tungsten filament management schedule does not schedule a filament for light generation again until another filament of the at least two filaments has completed its light-production duty cycle. In an embodiment, the light-production duty cycle of the filament is a function of an estimated useful life of the filament. For example, the duty cycle may be a fraction of total estimated useful life, such as 1%, 5%, or 10%. In an embodiment, the controlling tungsten redeposition of the tungsten filament management schedule includes initiating a first light-production duty cycle for a first filament of the at least two filaments in response to a first user-activation of the tungsten-halogen lighting system, and initiating a second light-production duty cycle for a second filament of the at least two filaments in response to a subsequent second user-activation of the tungsten-halogen lighting system. For example, the tungsten filament management schedule switches to different filament and duty cycle each time the lighting system is turned on by a user, or every second time. In an embodiment, the controlling tungsten redeposition includes applying a light-production duty cycle to a filament of the at least two filaments in response to a signal received from an outside source. For example, the signal may include a time signal, or a command to a distributed system of tungsten-halogen lighting systems.

In an embodiment, the controlling tungsten redeposition includes applying a light-production duty cycle to a filament of the at least two filaments as a function of a characteristic temporal behavior of the halogen regenerative cycle with respect to the filament. For example, a characteristic temporal behavior may include a rate of tungsten regeneration. For example, it may be undesirable for too much tungsten to condense on any one filament. In an embodiment, the controlling tungsten redeposition includes applying a light-production duty cycle of less than about ten hours to a filament of the at least two filaments. In an embodiment, the controlling tungsten redeposition includes flowing a first electric current through a first tungsten filament and flowing a second electric current through a second tungsten filament of the at least two tungsten filaments. The second electric current less than the first electric current. The second electric current is sufficient to make the second filament active in the halogen regenerative cycle. For example, in this embodiment, the first electric current is the normal amperage used to generate light in the tungsten-halogen lighting system, and this current will initiate the halogen regenerative cycle and redeposit tungsten on the first filament. In this example, the second electric current is less than the first electric current, but is enough to initiate the halogen regenerative cycle and redeposit tungsten on the second filament. It is anticipated that this will provide additional tungsten redeposition on the second filament over what it might have received during its duty cycle. In this example, the additional tungsten redeposition may be used to catch up a filament that has not experienced an expected tungsten redeposition, or it may be used in the normal course of managing tungsten redeposition on the at least two filaments.

In an embodiment, the filament management schedule 1134 further includes managing a respective flow of electric current through each tungsten filament of the at least two tungsten filaments 1120 so that not all of the at least two tungsten filaments are generating light at any one time. In an embodiment, the filament management schedule further includes maintaining a substantially uniform level of light generation by the at least two filaments. In an embodiment, the filament management schedule further includes removing a failed tungsten filament from management by the tungsten filament management schedule. In an embodiment, the filament management schedule further includes removing a tungsten filament undergoing an incipient failure from management by the tungsten filament management schedule.

Figure 14:
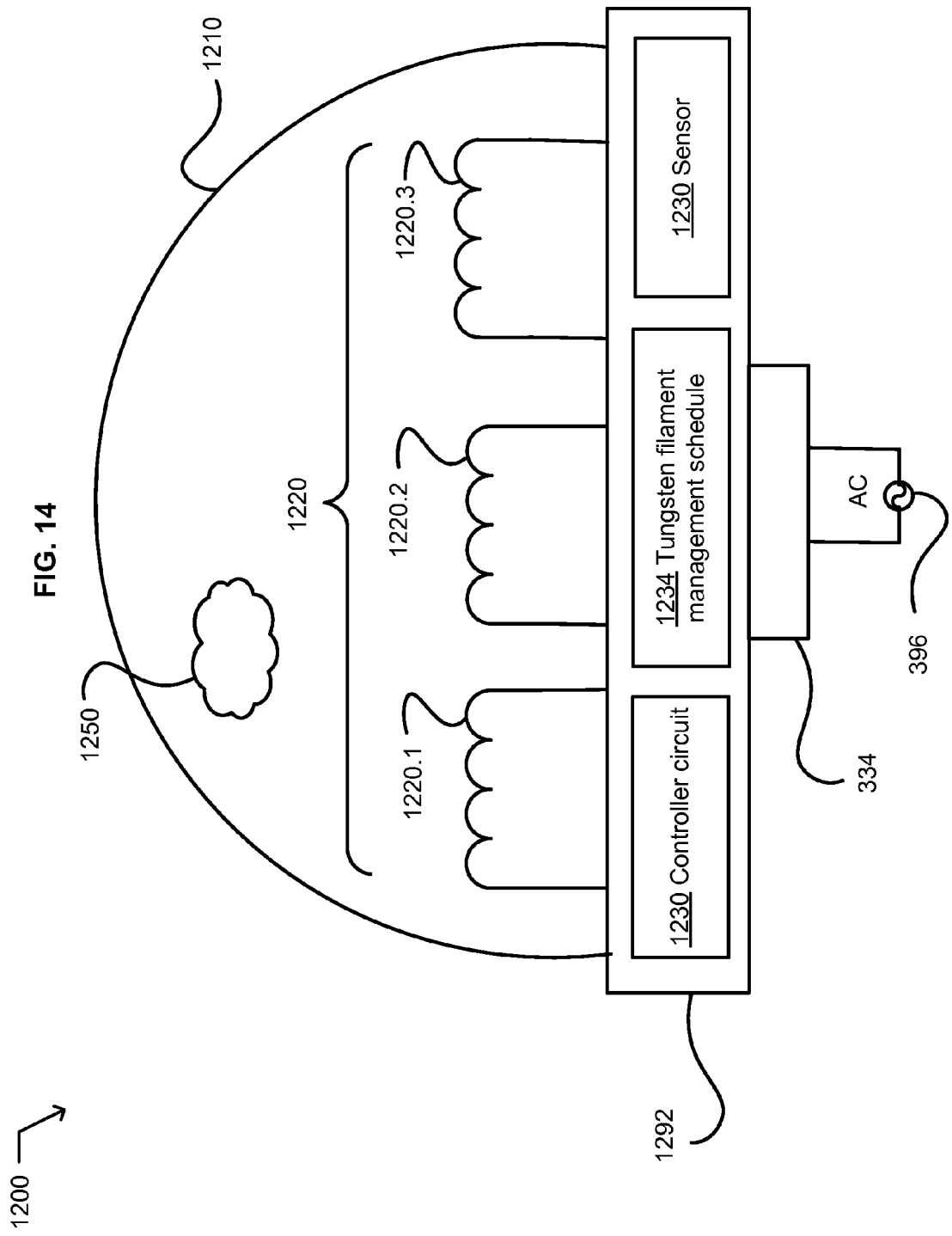
FIG. 14 illustrates an example tungsten-halogen lighting system 1200.

FIG. 14 illustrates an example tungsten-halogen lighting system 1200. The system includes a sealed glass envelope 1210 containing a halogen gas 1250. The system includes at least two tungsten filaments 1220 enclosed within the glass envelope. Each tungsten filament of the at least two tungsten filaments is configured to generate light in response to a flow of electric current. The system includes a sensor 1230 configured to detect an indicia of tungsten redeposition on a tungsten filament of the at least two tungsten filaments and to generate a sensor signal indicative of the indicia. The system includes a controller circuit 1230 configured to manage the at least two tungsten filaments in response to a tungsten filament management schedule 1234. The tungsten filament management schedule includes controlling tungsten redeposition by the halogen regenerative cycle on each tungsten filament of the at least two tungsten filaments at least partially based on the sensor signal.

In an embodiment, the sensor signal generated by the sensor 1230 indicates a current flow rate through a tungsten filament of the at least two tungsten filaments 1220. In an embodiment, the sensor signal indicates a temperature of a tungsten filament of the at least two tungsten filaments. In an embodiment, the sensor signal indicates a color temperature of a tungsten filament of the at least two tungsten filaments. In an embodiment, the sensor signal indicates a measure of light generated by a tungsten filament of the at least two tungsten filaments.

In an embodiment, the controlling tungsten redeposition by the tungsten filament management schedule 1234 includes adjusting a scheduled flow of electric current through a tungsten filament of the at least two tungsten filaments 1220 at least partially based on the sensor signal. For example, duration of a scheduled flow of electric current may be extended to increase tungsten redeposition, or may be shortened to decrease tungsten redeposition. In an embodiment, the adjusting includes increasing a length of a light-production duty cycle of the tungsten filament. In an embodiment, the adjusting includes decreasing a length of a light-production duty cycle of the tungsten filament. In an embodiment, the controlling tungsten redeposition includes reducing a scheduled flow of electric current through a tungsten filament of the at least two tungsten filaments at least partially based on a sensor signal indicative of a rate of thickening of the tungsten filament exceeding a predetermined rate. For example, reducing a scheduled flow of electric current may include reducing a duration or a rate of current flow. For example, a rate of thickening may indicate scavenged tungsten is accumulating too quickly on the tungsten filament. For example, a sensor signal indicative of increased current flow beyond a target current flow may indicate an increased diameter of a filament and correspondingly excessive accumulation of scavenged tungsten. For example, a sensor signal indicative of increased color temperature may also indicate increased current flow beyond a target current flow due to an increased diameter of a filament, and correspondingly excessive accumulation of scavenged tungsten. For example, reducing a duration or rate of current may cool the filament and is expected to reduce the rate of tungsten redeposition on the tungsten filament, thus preventing over thickening. In an embodiment, the controlling tungsten redeposition includes increasing a duration of scheduled flow of electric current through a tungsten filament of the at least two tungsten filaments at least partially based on a sensor signal indicative of a rate of thickening of the tungsten filament being below a predetermined rate. In an embodiment, the controlling tungsten redeposition includes terminating a flow of electric current through a tungsten filament of the at least two tungsten filaments at least partially based on a sensor signal indicative of a thickening of the tungsten filament exceeding a predetermined value. For example, the thickening may be indicated by increased current flow, or color temperature change, because resistance decreases as a filament thickens, and current correspondingly increases and color temperature changes. In an embodiment, the controlling tungsten redeposition includes terminating a flow of an electric current through a tungsten filament of the at least two tungsten filaments in response to a sensor signal indicative of a temporal increase in electric current exceeding a predetermined value.

In an embodiment, the tungsten filament management schedule 1234 further includes managing a respective flow of electric current through each tungsten filament of the at least two tungsten filaments 1220 so that not all of the at least two tungsten filaments are generating light at any one time. In an embodiment, the tungsten filament management schedule further includes maintaining a substantially uniform level of light generation by the at least two tungsten filaments.

Figure 15:
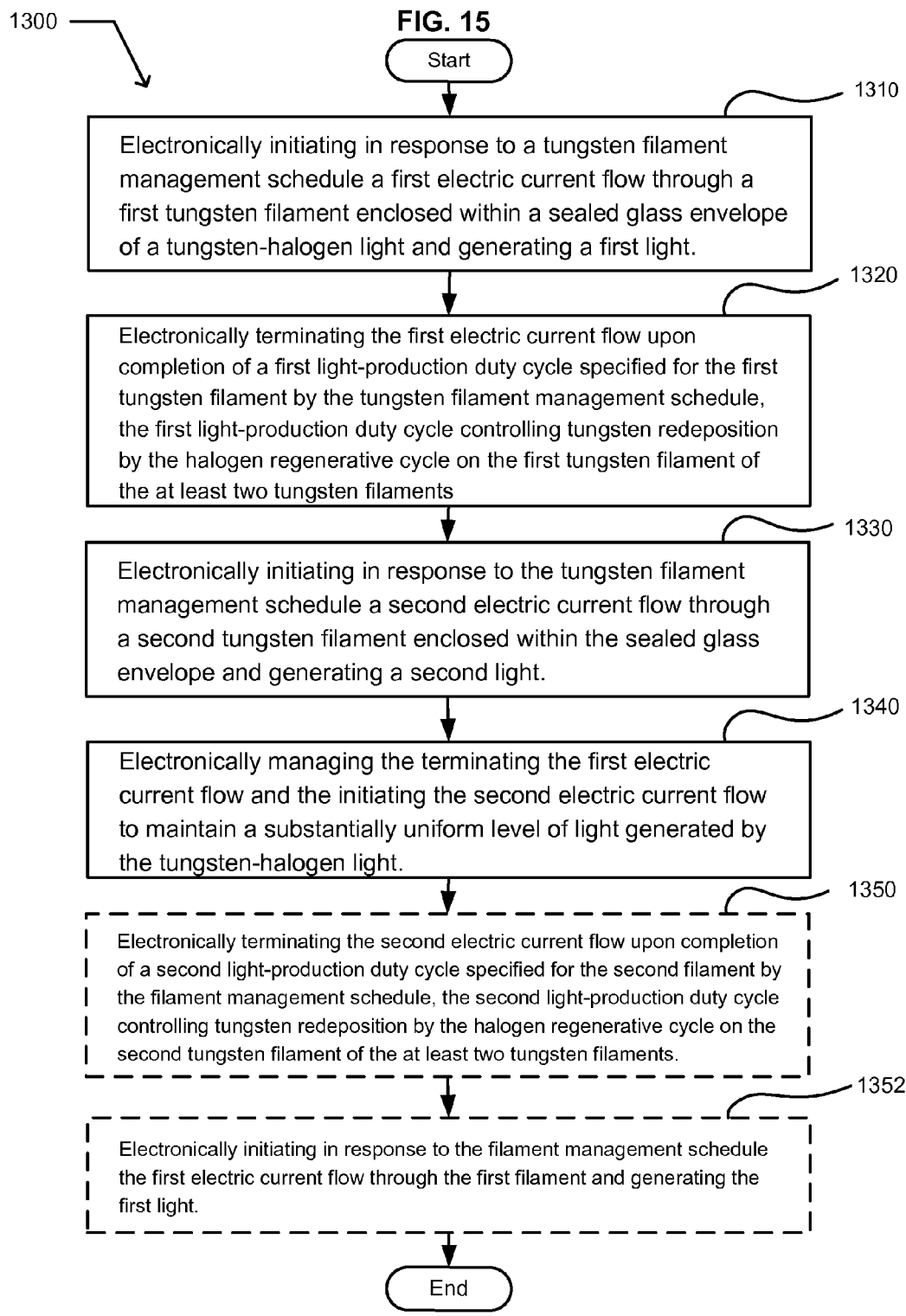
FIG. 15 illustrates an example operational flow 1300.

FIG. 15 illustrates an example operational flow 1300. After a start operation, the operational flow includes a first lighting operation 1310. The first lighting operation includes electronically initiating in response to a tungsten filament management schedule a first electric current flow through a first tungsten filament enclosed within a sealed glass envelope of a tungsten-halogen light and generating a first light. In an embodiment, the first lighting operation may be implemented by the controller circuit 1230 flowing a first electric current through the tungsten filament 1220.1 of the tungsten-halogen lighting system 1200 in response to the tungsten filament management schedule 1234 as described in conjunction with FIG. 14. A first extinguishing operation 1320 includes electronically terminating the first electric current flow upon completion of a first light-production duty cycle specified for the first tungsten filament by the tungsten filament management schedule. The first light-production duty cycle controlling tungsten redeposition by the halogen regenerative cycle on the first tungsten filament of the at least two tungsten filaments. In an embodiment, controlling tungsten deposition includes limiting tungsten redeposition. In an embodiment, controlling tungsten deposition includes facilitating tungsten redeposition. In an embodiment, the first extinguishing operation may be implemented by the controller circuit 1230 stopping the flow of electric current through filament 1220.1 in response to the filament management schedule 1234 as described in conjunction with FIG. 14. A second lighting operation 1330 includes electronically initiating in response to the tungsten filament management schedule a second electric current flow through a second tungsten filament enclosed within the sealed glass envelope and generating a second light. In an embodiment, the second lighting operation may be implemented by the controller circuit 1230 flowing a second electric current through filament 1220.2 of the tungsten-halogen lighting system 1200 in response to the tungsten filament management schedule 1234 as described in conjunction with FIG. 14. A control operation 1340 includes electronically managing the terminating the first electric current flow and the initiating the second electric current flow to maintain a substantially uniform level of light generated by the tungsten halogen light. The control operation may be implemented by the controller circuit 1230. The operational flow includes an end operation.

In an embodiment, the operational flow 1300 includes an operation 1350 and an operation 1352. The operation 1350 includes electronically terminating the second electric current flow upon completion of a second light-production duty cycle specified for the second filament by the filament management schedule. The second light-production duty cycle controlling tungsten redeposition by the halogen regenerative cycle on the second tungsten filament of the at least two tungsten filaments. The operation 1352 includes electronically initiating in response to the filament management schedule the first electric current flow through the first filament and generating the first light.

Figure 16:
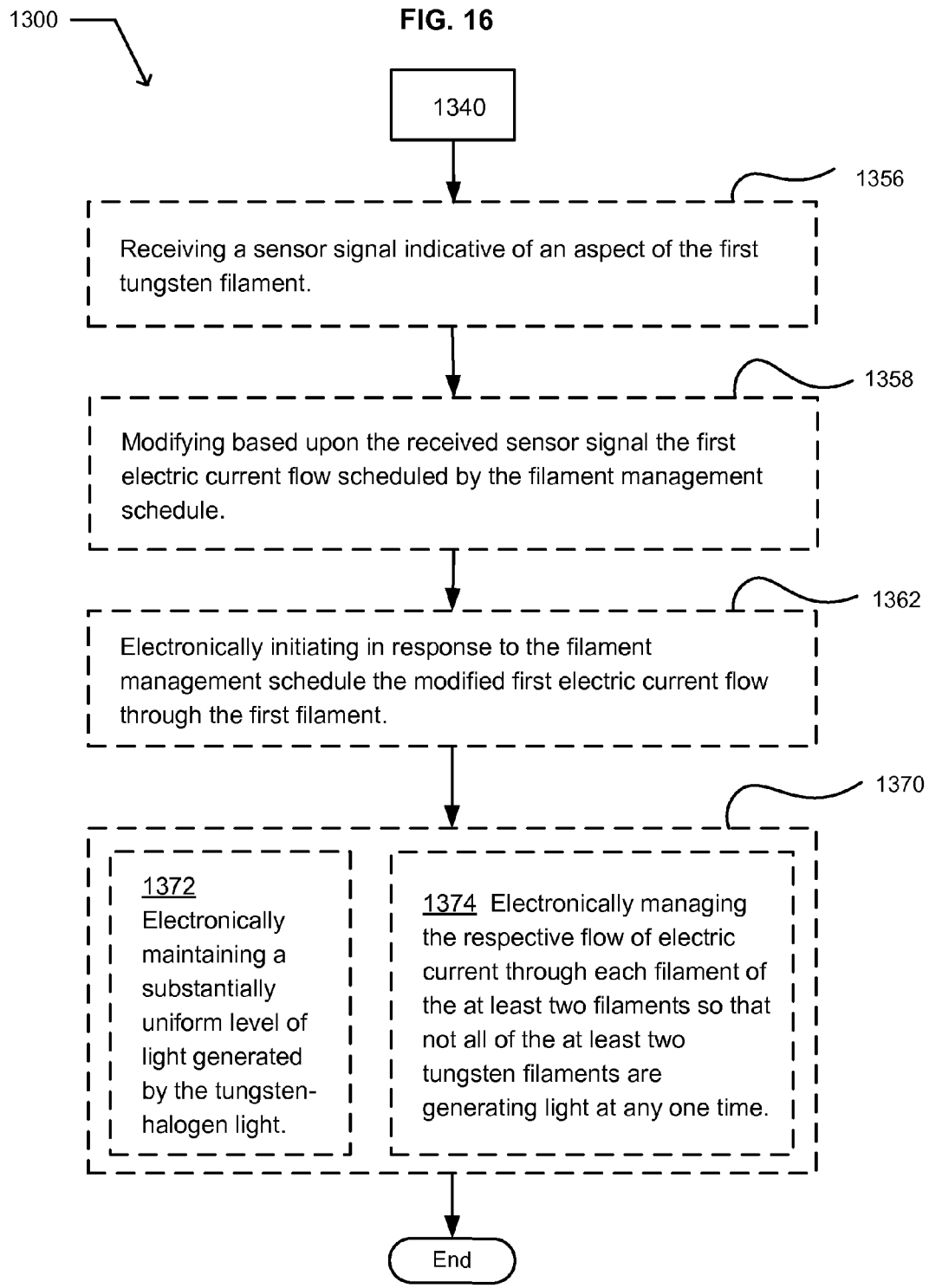
FIG. 16 illustrates an alternative embodiment of the operational flow 1300 described in conjunction with FIG. 15.

FIG. 16 illustrates an alternative embodiment of the operational flow 1300 of FIG. 15. In an embodiment, the alternative embodiment of operational flow includes an operation 1356, an operation 1358, and an operation 1362. The operation 1356 includes receiving a sensor signal indicative of an aspect of the first tungsten filament. The operation 1358 includes modifying based upon the received sensor signal the first electric current flow scheduled by the filament management schedule. The operation 1362 includes electronically initiating in response to the filament management schedule the modified first electric current flow through the first filament. In an embodiment, the modifying the first electric current includes extending the light-production duty cycle of the first filament. In an embodiment, the modifying the first electric current includes shortening the light-production duty cycle of the first filament.

In an embodiment, the alternative embodiment of the operational flow may include at least one additional operation 1370. The at least one additional operation may include an operation 1372, or an operation 1374. The operation 1372 includes electronically maintaining a substantially uniform level of light generated by the tungsten-halogen light. The operation 1374 includes electronically managing the respective flow of electric current through each filament of the at least two filaments so that not all of the at least two tungsten filaments are generating light at any one time.

Figure 17:
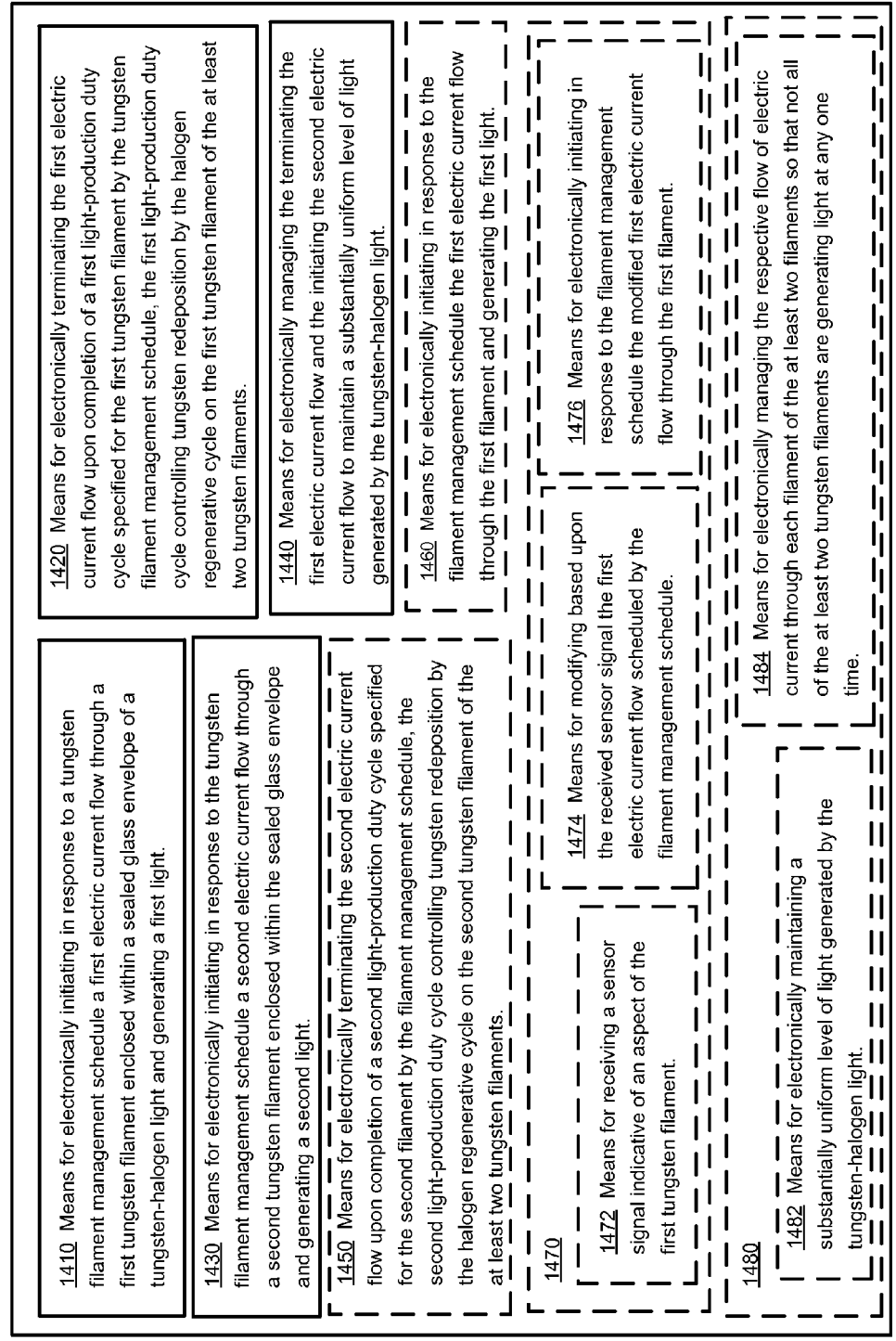
FIG. 17 illustrates an example system 1400.

FIG. 17 illustrates an example system 1400. The system includes means 1410 for electronically initiating in response to a tungsten filament management schedule a first electric current flow through a first tungsten filament enclosed within a sealed glass envelope of a tungsten-halogen light and generating a first light. The system includes means 1420 for electronically terminating the first electric current flow upon completion of a first light-production duty cycle specified for the first tungsten filament by the tungsten filament management schedule. The first light-production duty cycle controlling tungsten redeposition by the halogen regenerative cycle on the first tungsten filament of the at least two tungsten filaments. The system includes means 1430 for electronically initiating in response to the tungsten filament management schedule a second electric current flow through a second tungsten filament enclosed within the sealed glass envelope and generating a second light. The system includes means 1440 for electronically managing the terminating the first electric current flow and the initiating the second electric current flow to maintain a substantially uniform level of light generated by the tungsten-halogen light.

In an alternative embodiment, the system 1400 includes means 1450 for electronically terminating the second electric current flow upon completion of a second light-production duty cycle specified for the second filament by the filament management schedule. The second light-production duty cycle controlling tungsten redeposition by the halogen regenerative cycle on the second tungsten filament of the at least two tungsten filaments. The system includes means 1460 for electronically initiating in response to the filament management schedule the first electric current flow through the first filament and generating the first light.

In another alternative embodiment 1470 of the system 1400, the system 1400 includes means 1472 for receiving a sensor signal indicative of an aspect of the first tungsten filament. The system includes means 1474 for modifying based upon the received sensor signal the first electric current flow scheduled by the filament management schedule. The system includes means 1476 for electronically initiating in response to the filament management schedule the modified first electric current flow through the first filament.

In another alternative embodiment 1480, the system 1400 includes means 1482 for electronically maintaining a substantially uniform level of light generated by the tungsten-halogen light. In an alternative embodiment, the system includes means 1484 for electronically managing the respective flow of electric current through each filament of the at least two filaments so that not all of the at least two tungsten filaments are generating light at any one time.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims, the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An incandescent lighting system comprising:
a gas filled and sealed glass envelope;
at least two filaments enclosed within the glass envelope, each filament of the at least two filaments configured to generate light in response to a flow of electric current;
a sensor configured to detect a blue-shifted spectral content of light generated by a filament of the at least two filaments; and
a controller circuit configured to manage the at least two filaments in response to a filament management schedule and the detected blue-shifted spectral content, the filament management schedule includes
(i) maintaining a substantially uniform level of light generation by the at least two filaments, and
(ii) managing the respective flow of electric current through each filament of the at least two filaments.

2. The incandescent lighting system of claim 1, wherein the sealed glass envelope is fixedly attached to a housing.

3. The incandescent lighting system of claim 1, wherein the at least two filaments include at least two tungsten filaments.

4. The incandescent lighting system of claim 1, wherein a first filament of the at least two filaments generates visible light having a first feature, and a second filament of the at least two filament generates visible light having a second feature.

5. The incandescent lighting system of claim 1, wherein each filament can be switched on and off more than once over its lifetime.

6. The incandescent lighting system of claim 1, wherein the controller is located external of the glass envelope.

7. The incandescent lighting system of claim 1, wherein the controller is enclosed within the glass envelope.

8. The incandescent lighting system of claim 1, wherein the controller is configured to automatically and without human intervention manage the respective flow of electric current through each filament of the at least two filaments.

9. The incandescent lighting system of claim 1, wherein the managing the respective flow of electric current includes selecting a time interval of electric current passage through each filament of the at least two filaments.

10. The incandescent lighting system of claim 1, wherein the managing the respective flow of electric current includes re-burning each filament of the at least two filaments after each of them had been burned once, with a shorter burn cycle being employed for each filament for each subsequent iteration.

11. The incandescent lighting system of claim 1, wherein the managing the respective flow of electric current includes operating a first filament of the at least two filaments until an indication of failure of the first filament, and operating a second filament of the at least two filaments until an indication of failure of the second filament.

12. The incandescent lighting system of claim 1, wherein the managing the respective flow of electric current includes activating each filament for a desired fraction of an estimated total operating life of the light.

13. The incandescent lighting system of claim 1, wherein the managing the respective flow of electric current includes managing the respective flow of electric current through each filament of the at least two filaments with an objective of obtaining maximum total life from the at least two filaments.

14. The incandescent lighting system of claim 1, wherein the managing the respective flow of electric current includes managing the respective flow of electric current through each filament of the at least two filaments with an objective of maintaining a substantially uniform light output from the at least two filaments.

15. The incandescent lighting system of claim 1, wherein the managing the respective flow of electric current includes managing the respective flow of electric current in an adaptively-learned response to usage patterns of the incandescent lighting system.

16. The incandescent lighting system of claim 1, wherein the managing the respective flow of electric current includes managing the respective flow of electric current through each filament of the at least two filaments in response to an optimization algorithm.

17. The incandescent lighting system of claim 1, wherein the managing the respective flow of electric current includes a human user selectable aspect.

18. The incandescent lighting system of claim 1, wherein the managing the respective flow of electric current includes switching each filament of the at least two filaments on for a set time period.

19. The incandescent lighting system of claim 1, wherein the managing the respective flow of electric current includes switching each filament of the at least two filaments on for a random period, or in a random order.

20. The incandescent lighting system of claim 1, wherein the managing the respective flow of electric current includes simultaneously switching on at least two filaments of at least three filaments enclosed within the glass envelope, and simultaneously switching off one of the at least two filaments while switching on another filament of the at least three filaments.

21. The incandescent lighting system of claim 1, wherein the managing the respective flow of electric current includes managing the respective flow of electric current through each filament of the at least two filaments in response to an external command or in response to a condition.

22. The incandescent lighting system of claim 1, wherein the managing the respective flow of electric current includes managing the respective flow of electric current through each filament of the at least two filaments in response to an external condition.

23. The incandescent lighting system of claim 1, wherein the managing the respective flow of electric current includes varying the current through the at least two filaments and maintaining a constant luminous output as one filament is turned off and another filament is turned on.

24. The incandescent lighting system of claim 1, wherein the managing the respective flow of electric current includes minimizing any human noticeable change in brightness or color temperature of the light outputted by the incandescent lighting system.

25. The incandescent lighting system of claim 1, wherein the controller circuit is further configured to determine if a filament of the at least two filaments has failed, and if so, withdraw that filament in its management of the at least two filaments.

26. The incandescent lighting system of claim 1, wherein the controller circuit includes at least partly electromechanical current switching elements.

27. The incandescent lighting system of claim 1, wherein the controller circuit includes least partly electronic current switching elements.

28. The incandescent lighting system of claim 1, further comprising:
a power supply circuit configured to supply a voltage or waveform suitable for use by the controller circuit.

29. The incandescent lighting system of claim 28, wherein the power supply circuit is further configured to supply a particular current to a filament of the at least two filaments in response to the filament management schedule.

30. The incandescent lighting system of claim 1, wherein the controller circuit is further configured to test a filament of the at least two filaments in response to the filament management schedule.

31. The incandescent lighting system of claim 30, wherein the controller is further configured to estimate the light generated by the filament in response to the test of the filament.

32. The incandescent lighting system of claim 30, wherein the controller is further configured to predict an incipient failure of a filament in response to the test of a filament, and to modify the filament management schedule in response to the prediction.

33. An incandescent lighting system comprising:
a gas filled and sealed glass envelope;
at least two filaments enclosed within the glass envelope, each filament of the at least two filaments configured to generate light in response to a flow of electric current;
a sensor configured to detect a blue-shifted spectral content of light generated by a filament of the at least two filaments;
a controller circuit configured to manage the at least two filaments in response to a filament management schedule and the detected blue-shifted spectral content, the filament management schedule includes managing a respective flow of electric current through each filament of the at least two filaments; and
an accumulation element enclosed within the glass envelope and structured to facilitate deposition thereon of material evaporated by at least one filament of the at least two filaments.

34. The incandescent lighting system of claim 33, wherein the accumulation element is located within the glass envelope at a position so that its temperate is typically less than a temperature of a filament generating light of the at least two filaments.

35. The incandescent lighting system of claim 33, further comprising:
a heat sink.

36. The incandescent lighting system of claim 35, wherein the accumulation element is thermally coupled with a heat sink.

37. The incandescent lighting system of claim 33, wherein the accumulation element is located within the glass envelope at an intended operating elevation or orientation at least as high as a filament generating light in a first operating orientation.

38. The incandescent lighting system of claim 33, further comprising:
a flow directing element enclosed within the glass envelope and structured to urge a flow of heated gas and material evaporated from a filament toward the accumulation element.

39. The incandescent lighting system of claim 38, wherein the flow directing element is structured to direct a convective flow of the gas filling the glass envelope toward the accumulation element.

40. The incandescent lighting system of claim 33, wherein the filament management schedule further includes managing the respective flow of electric current through each filament of the at least two filaments so that not all of the at least two filaments generate light at any one time.

41. A method comprising:
electronically initiating in response to a filament management schedule a first electric current flow through a first filament enclosed within a sealed glass envelope of an incandescent light and generating a first light;
electronically sensing a blue-shifted spectral content of light generated by the first filament
electronically terminating the first electric current flow in response to the filament management schedule and the sensed blue-shifted spectral content;
electronically initiating in response to the filament management schedule a second electric current flow through a second filament enclosed within the sealed glass envelope and generating a second light; and
electronically maintaining a substantially uniform level of light generated by the incandescent light.

42. The method of claim 41, further comprising:
electronically managing the respective flow of electric current through each filament of the incandescent light so that not all of the filaments are generating light at any one time.

43. The method of claim 41, further comprising:
electronically terminating the second electric current flow in response to the filament management schedule;
electronically initiating the first electric current flow through the first filament in response to the filament management schedule and generating the first light; and
electronically managing the terminating the second electric current flow and the initiating the first electric current flow to result in the substantially uniform level of light generated by the incandescent light.

44. The method of claim 41, further comprising:
electronically terminating the second electric current flow in response to the filament management schedule;
electronically initiating a third electric current flow through a third filament enclosed within the sealed glass envelope in response to the filament management schedule and generating a third light; and electronically managing the terminating the second electric current flow and the initiating the third electric current flow to result in the substantially uniform level of light generated by the incandescent light.

45. The method of claim 44, further comprising:
electronically terminating the third electric current flow in response to the filament management schedule;
electronically initiating the first electric current flow through the first filament in response to the filament management schedule and generating the first light; and
electronically managing the terminating the third electric current flow and the initiating the first electric current flow to result in the substantially uniform level of light generated by the incandescent light.

46. The method of claim 41, further comprising:
depositing a first material evaporated by the first filament onto a first accumulation element enclosed within the sealed glass envelope; and
depositing a second material evaporated by the second filament onto the second accumulation element enclosed within the sealed glass envelope.

47. The method of claim 46, further comprising:
flowing the first material toward the first accumulation element.

48. The method of claim 46, further comprising:
flowing the second material toward the second accumulation element.

49. A system comprising:
means for electronically initiating in response to a filament management schedule a first electric current flow through a first filament of an incandescent light and generating a first light;
means for electronically sensing a blue-shifted spectral content of light generated by the first filament;
means for electronically terminating the first electric current flow in response to the filament management schedule and the sensed blue-shifted spectral content;
means for electronically initiating in response to the filament management schedule a second electric current flow through a second filament of the incandescent light and generating a second light; and
means for electronically managing the terminating the first electric current flow and the initiating the second electric current flow to result in a substantially uniform level of light generated by the incandescent light.

50. The incandescent lighting system of claim 1, wherein the sealed glass envelope includes a gas filled, sealed glass envelope.

51. The incandescent lighting system of claim 1, wherein the managing the respective flow of electric current includes switching the respective flow of electric current from a first filament to a second filament of the at least two filaments.

52. The incandescent lighting system of claim 1, wherein the managing the respective flow of electric current includes modulating the respective flow of electric current through each filament of the at least two filaments.

53. The incandescent lighting system of claim 16, wherein the optimization algorithm is configured to minimize a burn-out probability of each filament of the at least two filaments.

54. The incandescent lighting system of claim 16, wherein the optimization algorithm is configured to maximize the useful life of each filament of the at least two filaments.

55. The incandescent lighting system of claim 16, wherein the optimization algorithm is configured to maximize the useful life of the incandescent light.

56. The incandescent lighting system of claim 28, wherein the power supply circuit is enclosed within the glass envelope or a housing coupled to the glass envelope.

57. The incandescent lighting system of claim 38, wherein the flow directing element is at least semi-transparent.

* * * * *

UNITED STATES PATENT AND TRADEMARK OFFICE
CERTIFICATE OF CORRECTION

PATENT NO. : 8,970,110 B2  Page 1 of 1
APPLICATION NO. : 13/653712
DATED : March 3, 2015
INVENTOR(S) : Roderick A. Hyde et al.

It is certified that error appears in the above-identified patent and that said Letters Patent is hereby corrected as shown below:

In the Claims

At Column 27, Line 26, Claim 27 "the controller circuit includes least partly electronic current" should read -- the controller circuit includes at least partly electronic current --

At Column 28, Line 1, Claim 34 "at a position so that its temperate is typically less than a . . ." should read -- at a position so that its temperature is typically less than a . . . --

At Column 28, Line 36, Claim 41 "light generated by the first filament" should read -- light generated by the first filament; --

Signed and Sealed this
Twenty-eighth Day of July, 2015

Michelle K. Lee
*Director of the United States Patent and Trademark Office*